(12) United States Patent
Van Riel et al.

(10) Patent No.: US 12,466,168 B2
(45) Date of Patent: Nov. 11, 2025

(54) MULTI-LAYER COMPOSITE ARTICLE INCLUDING A COVER LAYER AND A PC/ABS LAYER AND METHODS THEREOF

(71) Applicant: TRINSEO EUROPE GMBH, Horgen (CH)

(72) Inventors: Norwin Van Riel, Aardenburg (NL); Nicolaas M. A. Hermans, Terneuzen (NL); Pascal E. R. E. J. Lakeman, Breda (NL)

(73) Assignee: TRINSEO EUROPE GMBH, Horgen (CH)

( * ) Notice: Subject to any disclaimer, the term of this patent is extended or adjusted under 35 U.S.C. 154(b) by 668 days.

(21) Appl. No.: 16/331,684

(22) PCT Filed: Sep. 8, 2017

(86) PCT No.: PCT/EP2017/072655
§ 371 (c)(1),
(2) Date: Mar. 8, 2019

(87) PCT Pub. No.: WO2018/046698
PCT Pub. Date: Mar. 15, 2018

(65) Prior Publication Data
US 2019/0232620 A1 Aug. 1, 2019

Related U.S. Application Data

(60) Provisional application No. 62/409,636, filed on Oct. 18, 2016.

(30) Foreign Application Priority Data

Sep. 9, 2016 (EP) .................................. 16188106

(51) Int. Cl.
*B32B 27/08* (2006.01)
*B32B 5/18* (2006.01)
(Continued)

(52) U.S. Cl.
CPC ................ *B32B 27/08* (2013.01); *B32B 5/18* (2013.01); *B32B 27/065* (2013.01); *B32B 27/20* (2013.01);
(Continued)

(58) Field of Classification Search
CPC . B32B 2250/02; B32B 27/302; B32B 27/308; B32B 27/365; C08J 2455/02; C08L 69/00; C08L 9/00
See application file for complete search history.

(56) References Cited

U.S. PATENT DOCUMENTS

| | | | |
|---|---|---|---|
| 2,727,884 A | 12/1955 | McDonald et al. | |
| 3,028,365 A | 4/1962 | Hermann et al. | |

(Continued)

FOREIGN PATENT DOCUMENTS

| | | | |
|---|---|---|---|
| CN | 105856769 A | 8/2016 | |
| DE | 2442101 A1 | 3/1976 | |

(Continued)

OTHER PUBLICATIONS

International Search Report and Written Opinion, Application No. PCT/EP2017/072655 dated Dec. 4, 2017.
(Continued)

*Primary Examiner* — Maria V Ewald
*Assistant Examiner* — Daniel P Dillon
(74) *Attorney, Agent, or Firm* — The Dobrusin Law Firm, P.C.

(57) ABSTRACT

The teachings herein are directed to multi-layered articles, methods for making the multi-layered articles, and polymeric compositions for the multi-layered articles. The multi-layered article includes a substrate layer and an overmolded cover layer. The substrate layer preferably is a polymeric composition including about 55 weight percent or less (preferably about 50 weight percent or less) polycarbonate,
(Continued)

a styrene containing polymer, and an impact modifier. The cover layer preferably includes a polyurethane, a polyurea, or both. The substrate preferably forms a durable bond to the cover layer that maintains adhesion even after aging (e.g., heat, thermal cycling, UV light, visible light, humidity, climate aging, or any combination thereof).

20 Claims, 1 Drawing Sheet

(51) Int. Cl.
| | |
|---|---|
| B32B 27/06 | (2006.01) |
| B32B 27/20 | (2006.01) |
| B32B 27/28 | (2006.01) |
| B32B 27/30 | (2006.01) |
| B32B 27/36 | (2006.01) |
| B32B 27/40 | (2006.01) |
| C08J 7/04 | (2020.01) |
| C08J 7/043 | (2020.01) |
| C08J 7/046 | (2020.01) |
| C08J 7/05 | (2020.01) |
| C08L 55/02 | (2006.01) |
| C08L 69/00 | (2006.01) |

(52) U.S. Cl.
CPC ........... *B32B 27/28* (2013.01); *B32B 27/302* (2013.01); *B32B 27/308* (2013.01); *B32B 27/365* (2013.01); *B32B 27/40* (2013.01); *C08J 7/042* (2013.01); *C08J 7/0427* (2020.01); *C08J 7/043* (2020.01); *C08J 7/046* (2020.01); *C08J 7/05* (2020.01); *B32B 2250/02* (2013.01); *B32B 2250/24* (2013.01); *B32B 2264/0207* (2013.01); *B32B 2264/10* (2013.01); *B32B 2266/0278* (2013.01); *B32B 2270/00* (2013.01); *B32B 2307/4026* (2013.01); *B32B 2307/412* (2013.01); *B32B 2307/50* (2013.01); *B32B 2307/558* (2013.01); *B32B 2307/732* (2013.01); *B32B 2605/08* (2013.01); *C08J 2369/00* (2013.01); *C08J 2425/08* (2013.01); *C08J 2425/12* (2013.01); *C08J 2455/02* (2013.01); *C08J 2475/04* (2013.01)

(56) References Cited

U.S. PATENT DOCUMENTS

| | | | |
|---|---|---|---|
| 3,243,481 | A | 3/1966 | Ruffing et al. |
| 3,419,634 | A | 12/1968 | Vaughn |
| 3,660,535 | A | 5/1972 | Finch et al. |
| 4,217,438 | A | 8/1980 | Brunelle et al. |
| 4,218,543 | A | 8/1980 | Weber et al. |
| 4,239,863 | A | 12/1980 | Bredeweg |
| 4,529,791 | A | 7/1985 | Glass |
| 4,572,819 | A | 2/1986 | Priddy et al. |
| 4,585,825 | A | 4/1986 | Wesselmann |
| 4,666,987 | A | 5/1987 | Burnmester et al. |
| 4,677,162 | A | 6/1987 | Grido et al. |
| 4,764,540 | A | 8/1988 | Dewhurst et al. |
| 5,192,814 | A | 3/1993 | Oshima et al. |
| 5,331,051 | A | 7/1994 | Ishibashi et al. |
| 5,717,021 | A * | 2/1998 | Huang ............... C08K 5/1345 524/502 |
| 6,461,732 | B1 | 10/2002 | Wittmann et al. |
| 2002/0058716 | A1 | 5/2002 | Wittman et al. |
| 2002/0160177 | A1 | 10/2002 | Warth et al. |
| 2004/0266951 | A1 | 12/2004 | Akiyama et al. |
| 2005/0218547 | A1 | 10/2005 | Roche et al. |
| 2006/0004154 | A1 | 1/2006 | DeRudder et al. |
| 2007/0106028 | A1 | 5/2007 | Maes et al. |
| 2008/0004373 | A1 | 1/2008 | Volkers et al. |
| 2010/0021718 | A1* | 1/2010 | Vos ........................ B32B 27/08 428/317.9 |
| 2011/0027575 | A1 | 2/2011 | Drume et al. |
| 2011/0040035 | A1 | 2/2011 | Shields et al. |
| 2011/0129631 | A1 | 6/2011 | Van Nuffel |
| 2011/0135934 | A1 | 6/2011 | Seidel et al. |
| 2011/0159292 | A1* | 6/2011 | Eckel ...................... C08L 55/02 264/46.4 |
| 2011/0223400 | A1* | 9/2011 | Li ............................ B32B 27/40 428/215 |
| 2012/0165442 | A1* | 6/2012 | Feldermann ............ C08L 69/00 524/320 |
| 2013/0196130 | A1* | 8/2013 | Hufen ..................... C08L 69/00 524/451 |
| 2015/0111012 | A1* | 4/2015 | Egashira ............. C08G 18/758 427/385.5 |
| 2016/0244608 | A1 | 8/2016 | Hufen et al. |
| 2016/0251513 | A1* | 9/2016 | Hufen ................... B32B 27/365 428/304.4 |
| 2018/0312690 | A1 | 11/2018 | Hufen et al. |

FOREIGN PATENT DOCUMENTS

| | | | |
|---|---|---|---|
| DE | 2 646 141 | A1 | 4/1978 |
| DE | 2 844 922 | A1 | 4/1980 |
| DE | 10 007 821 | A1 | 8/2001 |
| DE | 10 024 624 | A1 | 11/2001 |
| EP | 0412801 | A1 | 2/1991 |
| EP | 0540985 | A1 | 5/1996 |
| EP | 0959087 | A1 | 11/1999 |
| EP | 0959115 | A1 | 11/1999 |
| EP | 1736293 | A1 | 12/2006 |
| JP | 2010126706 | A | 6/2010 |
| MX | PA03007594 | A | 12/2003 |
| MX | 2012/001344 | A | 2/2012 |
| MX | 2012/006521 | A | 9/2012 |
| MX | 2014/007863 | A | 9/2014 |
| MX | 2016/004995 | A | 2/2017 |
| TW | 201529714 | A1 | 8/2015 |
| WO | 01/88006 | A1 | 11/2001 |
| WO | 2004/065122 | A1 | 8/2004 |
| WO | 2011/107273 | A1 | 8/2004 |

OTHER PUBLICATIONS

Chinese Office Action, Application No. CN201780054862.4 dated May 11, 2021.
Schnell, Chemistry and Physics of Polycarbonates, Interscience Publishers, (19640000).
Taiwan Search Report, Application No. 106131061 dated Mar. 24, 2021.
Japanese Office Action, JP Application No. 2019-512884 dated Aug. 31, 2021.
Japanese Office Action, Application No. 2019-513300 dated Sep. 14, 2021.
Korean Office Action, Application No. 10-2019-70061130 dated Nov. 2, 2021.
Taiwan Office Action, Application No. 106131061 dated Oct. 25, 2021.
Mexican Office Action, Application No. MX 2019/002706 dated Mar. 26, 2024.
Mexican Office Action, Application No. MX 2019/002705 dated Mar. 26, 2024.

* cited by examiner

MULTI-LAYER COMPOSITE ARTICLE INCLUDING A COVER LAYER AND A PC/ABS LAYER AND METHODS THEREOF

PRIORITY

The present application claims priority to European Patent Application No. EP 16188106.5 filed on Sep. 9, 2016 entitled "Multi-layer composite article including polyurethane layer and PC/ABS layer" and to U.S. Provisional Patent Application 62/409,636 filed on Oct. 18, 2016, each incorporated herein by reference in its entirety the contents of which are incorporated herein by reference in its entirety.

FIELD

The teachings herein relate to multi-layered articles including a cover layer (e.g., a polyurethane layer, a polyurea layer, or both) in direct contact with a substrate layer (e.g., a polycarbonate-containing layer). The substrate layer preferably includes a blend comprising a polycarbonate and a toughening component. The toughening component may include a styrene acrylonitrile copolymer and an impact modifier (preferably an elastomer, such as polybutadiene). The weight ratio of the polycarbonate to the toughening component preferably is less than 55:45. The multi-layered articles may be used for automotive interior and/or automotive interior and/or exterior trim parts and preferably have strong adhesion of the cover layer to the substrate layer before and/or after aging. The cover layer preferably is molded over a surface of the substrate layer in a process including injecting a polymerizable composition into a mold for filling a gap over a surface of the substrate layer and at least partially polymerizing the polymerizable composition for forming a polyurethane and/or a polyurea.

BACKGROUND

Composite materials including a substrates of poly(methyl methacrylate) (i.e., PMMA) and an overmolded layer of a polyurethane have been employed in automotive parts. However, PMMA has a generally high density (about 1.18 g/cm$^3$ for neat resins and higher for filled resins) and the PMMA substrate layer must generally be thick to meet structural requirements. In order to improve to reduce the weight of the composite parts, there has been recent efforts for replacing PMMA with polycarbonate containing compositions.

Various polymeric compositions including polycarbonate (i.e., PC) and acrylonitrile-butadiene-styrene thermoplastic (i.e., ABS) have been used for automotive interior components and/or automotive exterior components. These PC/ABS containing compositions may be formulated to have performance properties such as high ductility and/or impact resistance, good heat resistance, and dimensional stability required by these applications. In some applications, such as applications requiring durable surface properties (e.g., scratch and mar resistance) and/or specific aesthetic properties, the PC/ABS containing compositions are covered with a polyurethane layer. However, adhesion between the substrate (e.g., PC/ABS containing composition) and the polyurethane layer can easily deteriorate after aging, such as climate aging requirements for automotive interior and exterior components.

Various articles that include a polyurethane layer and/or a substrate layer including polycarbonate and/or ABS are described in US Patent Application Publications 2011/0135934A1 (Seidel et al., published on Jun. 9, 2011), 2005/0218547A1 (Roche et al., published on Oct. 6, 2005), 2013/0196130A1 (Hufen et al., published on Aug. 1, 2013), 2011/0027575A1 (Drube et al., published on Feb. 3, 2011), and U.S. Pat. No. 6,461,732 B1 (Wittmann et al., issued Oct. 8, 2002), and European Patent Application Publication EP 1736293 A1 (Hein) et al., published Dec. 27, 2006), the contents of which are each incorporated herein by reference in their entirety.

US Patent Application Publication 2011/0135934 (Seidel et al., Jun. 9, 2011) describes composite structures including a substrate layer containing generally high concentrations of polycarbonates, aromatic polyester carbonates and aromatic polyesters and an overmolded polyurethane or polyurea layer. This patent application teaches the need for high concentrations of polycarbonate in the substrate layer and provides little or no guidance into the need for durable adhesion after aging.

US Patent Application Publication 2013/0196130 A1 describes adhesion of polyurethane to polycarbonate/ABS blend compositions, requiring a polybutylene terephthalate or polyethylene terephthalate to achieve acceptable adhesion.

European Patent Application Publication EP 1736293A1 describes the difficulty of adhering PC/ABS compositions to polyurethane (see e.g., paragraph 003), and employs polyamide blend (e.g., with ABS) to improve the adhesion.

U.S. Pat. No. 6,461,732 B1 describes compositions that employ AlO(OH) particles (believed to be generally spherical particles having a median particle size of about 40 μm) for adhering to a thick polyurethane foam.

US Patent Application Publication US2011/0027575 A1 describes articles including a polyurethane layer and a substrate layer where the substrate layer is molded using a nitrogen foaming agent to improve the adhesion. The substrate layer includes high concentrations of polycarbonate and either has no filler (see e.g., PCS-2 in Table 1) or consisting substantially of a polycarbonate, an SAN copolymer, and glass fibers (see e.g., PCS-1 in Table 1).

US Patent Application Publication US 2005/0218547 A1 describes a variety of composite parts including a polyurethane layer, but is silent on the need for adhesion after aging (e.g., at elevated temperatures and/or humidity) and having low coefficient of linear thermal expansion.

There continues to exist a need for polymeric compositions (e.g., a blend including PC and ABS) for a substrate for automotive parts. In particular, there is a need for such compositions that also have good adhesion durability. Additionally, there is a need for composite articles having uniform molded-in color in a substrate layer and/or a cover layer. Furthermore, there is a need for lighter weight parts by down gaging the thickness and/or using compositions having lower density. There is also a need for improved methods of producing composite parts. Additionally, there is a need for composite articles including a substrate layer formed of a polymeric composition (e.g., an PC/ABS containing blend) and durably attached to an overmolded cover layer including a polyurethane, a polyurea, or both. For example, there is a need for such articles in which the adhesion between the layers is strong even after aging (e.g., at elevated temperatures, exposure to light, exposure to humidity, exposure to thermal cycling, or any combination thereof). Preferred compositions for the substrate layer are substantially or entirely free of polyesters (e.g., substantially or entirely free of polybutylene terephthalate and polyethylene terephthalate) and/or substantially or entirely free of polyamides. Preferred compositions for the substrate layer are substantially or entirely free of non-reinforcing fillers.

SUMMARY

In one aspect, the teachings herein are directed at polymeric composition having good adhesion to polyurethane and/or articles including a substrate including such a polymeric composition adhered to a cover layer of a polyurethane, polyurea, or both. The polymeric composition preferably has a low density and adheres to the cover layer even after aging at elevated temperature, humidity and/or exposure to light, and most preferably adheres to the cover layer after climate aging test. Preferred polymeric compositions include a polycarbonate component and a toughening component. The toughening component includes a styrene acrylonitrile copolymer and an impact modifier. The toughening component may include, consist essentially of (e.g., about 75 weight percent or more, or about 90 weight percent or more, or about 95 weight percent or more), or consist entirely of one or more styrene acrylonitrile copolymers, one or more acrylonitrile-styrene-butadiene thermoplastics (e.g., a mass ABS, an emulsion ABS a grafted ABS concentrate, or a combination thereof), or any combination thereof. The weight ratio of the polycarbonate component to the toughening component preferably is about 55:45 or less, more preferably about 50:50 or less. The toughening component preferably includes 3 weight percent to 23 weight percent of an impact modifier (e.g., a polybutadiene, such as found in the ABS). Existing PC/ABS formulations often suffer from loss in adhesion of a polyurethane top layer and/or require additional polymers that may affect various performance properties. It is now found that a substrate formed of an ABS in combination with a specified maximum amount of polycarbonate together and a specified amount of impact modifier results in improved adhesion performance (initial adhesion and adhesion after ageing) when overmoulded with a polyurethane and/or polyurea layer.

One aspect of the teachings is directed at a multi-layer article comprising: a substrate layer including a polymeric composition and a cover layer of a polyurethane and/or a polyurea bonded directly to the substrate layer. The polymeric composition preferably is a blend comprising: a polycarbonate polymer, and a toughening component including one or more styrene-containing copolymers. Optionally, the polymeric composition includes one or more reinforcing fillers (preferably a fiber, such as a glass fiber or a wollastonite). The amount of polyester in the polymeric composition preferably is less than about 5 weight percent, and more preferably about zero.

Another aspect of the teachings is directed at a multi-layer article comprising: i) a substrate layer including a polymeric composition, wherein the polymeric composition is a blend comprising: two or more polymers including a polycarbonate component and a toughening component, wherein the toughening component includes a styrene-acrylonitrile copolymer and an impact modifier; and ii) a cover layer including a polyurethane and/or a polyuria bonded directly to the substrate layer; wherein the concentration of the two or more polymers is about 70 weight percent or more (preferably about 83 weight percent or more and more preferably about 88 weight percent or more) and about 100 weight percent or less (preferably about 99 weight percent or less) based on the total weight of the polymeric composition. The total weight of the polycarbonate component and the toughening component preferably is about 75 weight percent to about 100 weight percent, based on the total weight of the two or more polymers of the polymeric composition. The weight ratio of the polycarbonate component to the toughening component is preferably about 10:90 or more (preferably about 20:80 or more, and more preferably about 25:75 or more) and about 55:45 or less (preferably about 50:50 or less, and more preferably about 45:55 or less). The concentration of the impact modifier may be about 3 weight percent or more (preferably about 5 weight percent or more, and more preferably about 7 weight percent or more) and about 23 weight percent or less (preferably about 18 weight percent or less, more preferably about 15 weight percent or less, and most preferably about 13 weight percent or less), based on the total weight of the two or more polymers.

Another aspect of the invention is directed at a method for producing a composite article, such as a composite article according to the teachings herein. Preferably, the method may comprise the steps of: i) creating a gap over a surface of a substrate layer having a surface in a mold cavity, wherein the substrate layer includes a polycarbonate having a glass transition temperature; ii) injecting a polymerizable composition into the mold cavity for forming a polyurethane and/or a polyurea; iii) contacting the surface with the polymerizable composition, wherein the surface has a temperature less than the glass transition temperature; and iv) at least partially polymerizing the polyurethane and/or the polyurea while the mold cavity is closed. Preferably, the substrate layer includes a polymeric composition that is a blend comprising: two or more polymers including the polycarbonate and a toughening component, wherein the toughening component includes a styrene-acrylonitrile copolymer and an impact modifier; wherein the concentration of the two or more polymers is about 70 weight percent or more (preferably about 83 weight percent or more and more preferably about 88 weight percent or more) and about 100 weight percent or less (preferably about 99 weight percent or less) based on the total weight of the polymeric composition, the total weight of the polycarbonate and the toughening component is about 75 weight percent to about 100 weight percent, based on the total weight of the two or more polymers of the polymeric composition, and the weight ratio of the polycarbonate to the toughening component is about 10:90 or more (preferably about 20:80 or more, and more preferably about 25:75 or more) and about 55:45 or less (preferably about 50:50 or less, and more preferably about 45:55 or less), and the concentration of the impact modifier is about 3 weight percent or more (preferably about 5 weight percent or more, and more preferably about 7 weight percent or more) and about 23 weight percent or less (preferably about 18 weight percent or less, more preferably about 15 weight percent or less, and most preferably about 13 weight percent or less), based on the total weight of the two or more polymers. The method preferably includes a step of forming a substrate layer (e.g., molding a substrate layer). The method preferably includes a step of forming a cover layer over the substrate layer (e.g., molding a cover layer). The method preferably includes a step of polymerizing and/or crosslinking a cover layer over the substrate layer.

The various aspects of the teachings herein may be further characterized by one or any combination of the following features: the amount of polyester in the polymeric composition is about zero or less than about 5 weight percent; the impact modifier is present in an amount of 25 to 85 weight percent (preferably 45 to 75 weight percent, and more preferably 55 to 75 weight percent), based on the total weight of the toughening component; the impact modifier is a polybutadiene rubber; the toughening component includes a mass ABS; the toughening component includes a grafted ABS impact modifier; the ABS impact modifier includes (about 45 weight percent or more, more preferably about 55 weight percent or more) polybutadiene; the ABS impact modifier includes about 85 weight percent or less (preferably about 75 weight percent or less) polybutadiene, based on the total weight of the grafted ABS impact modifier; the polymeric composition includes the polycarbonate component is an amount of about 20 weight percent or more (preferably about 25 weight percent or more, more preferably about 30 weight percent or more; and most preferably about 35 weight percent or more), based on the total weight of the polymeric composition; the polymeric composition includes the polycarbonate composition in an amount of about 70 weight percent or less (preferably about 55 weight percent or less, more preferably about 50 weight percent or less, and more preferably about 45 weight percent or less); the polymeric composition includes an ABS thermoplastic (i.e., an acrylonitrile-butadiene-styrene thermoplastic) including a polybutadiene containing phase dispersed in a styrene-containing phase including the styrene acrylonitrile copolymer; the styrene acrylonitrile copolymer includes about 60 weight percent or more styrene (and preferably about 82 weight percent or less styrene) and about 15 weight percent or more acrylonitrile (and preferably about 33 weight percent or less acrylonitrile), based on the total weight of the acrylonitrile styrene copolymer; the styrene acrylonitrile copolymer is a random copolymer consisting essentially (e.g., consisting about 90 wt. % or more, about 95 wt. % or more, about 97 wt. % or more, or about 99 wt. % or more, and preferably consisting entirely of) acrylonitrile and styrene; the impact modify is grafted to the styrene acrylonitrile copolymer; the polymeric composition includes a reinforcing filler in an amount from about 3 weight percent to about 30 weight percent (preferably from about 5 weight percent to about 23 weight percent, and most preferably from about 7 weight percent to about 15 weight percent), based on the total weight of the polymeric composition; the reinforcing filler includes glass fibers, wollastonite, or both; the substrate layer has a thickness from about 0.3 mm to about 10 mm (preferably about 0.5 mm to about 5 mm); the cover layer has a thickness from about 0.2 mm to about 1.5 mm (preferably from about 0.3 mm to about 1.0 mm, and more preferably from about 0.3 mm to about 0.8 mm); the amount of any talc in the polymeric composition is about 2 weight percent or less (preferably about 1 weight percent or less, and more preferably the polymeric composition is free of talc); the cover layer is a compact layer having a porosity of about 20 volume percent or less (preferably about 10 volume percent or less, more preferably about 5 volume percent or less, and most preferably about 2 volume percent or less); the substrate layer includes a molded-in colorant; the cover layer includes a molded-in colorant; the polymeric composition includes from about 0.2 to about 9 weight percent (preferably from about 1 to about 7 weight percent, even more preferably from about 1.5 to about 5 weight percent, and most preferably from about 2 to about 4 weight percent) of one or more ethylene copolymers; the ethylene copolymer includes a functionalized monomer; the substrate layer is colored by a pigment or other colorant; the cover layer is substantially clear and/or substantially transparent; the total amount of the filler (preferably the wollastonite), the toughening component (preferably the mass ABS and any additional styrene-acrylonitrile copolymer), and the polycarbonate in the substrate layer is about 95 weight percent or more, based on the total weight of the substrate layer; the weight ratio of the polycarbonate component to the toughening component is about 55:45 or less (preferably about 50:50 or less, and most preferably about 45:55 or less); the substrate layer is a dense substrate layer (e.g., having a porosity of about 10 volume percent or less, preferably 5 volume percent or less); the amount of the toughening component that is other than mass ABS preferably is less than 60 weight percent (more preferably less than 40 weight percent, even more preferably less than 25 weight percent, based on the total weight of the toughening component); the substrate is formed without foaming agent; the amount of any styrene copolymer including maleic anhydride, maleic acid, or other monomer that provides a carboxyl group to the copolymer in the substrate layer is about 0.9 weight percent or less (based on the total weight of the polymeric composition, or based on the total weight of the substrate layer); the substrate layer includes one or more additives selected from the group consisting of an antioxidant, a process aid, a light stabilizer, a heat stabilizer, a mod release agent and a flow modifier; the wollastonite is a coated wollastonite; or the wollastonite includes an organic sizing.

DETAILED DESCRIPTION

Figure 1A:
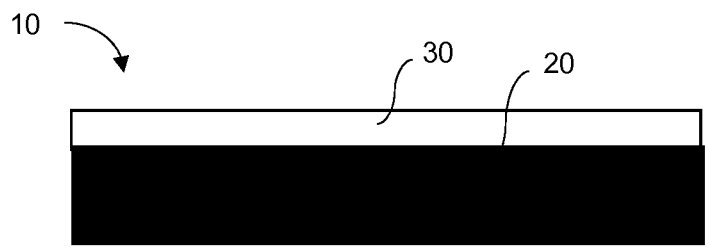
FIG. 1A is an illustrative cross-sectional view of a composite article 10 including a substrate layer 20 and a cover layer 30. The interface between the substrate layer and the cover layer may be generally planar, such as shown in FIG. 1A.
Figure 1B:
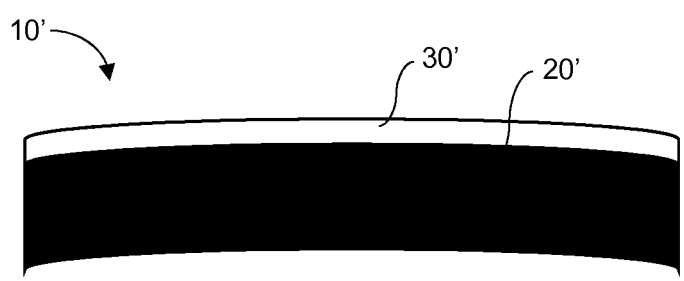
FIG. 1B is an illustrative cross-sectional view of a composite article 10' including a substrate layer 20' and a cover layer 30'. The interface between the substrate layer and the cover layer may be curved, such as shown in FIG. 1B.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The needs for a substrate layer having good adhesion (including durable adhesion) to a cover layer and having one or more characteristics described herein for a substrate layer is achieved using a polymeric composition including a polycarbonate, and a toughening component including a rubber-modified monovinylidene aromatic thermoplastic. Such compositions may preferably provide high stiffness, low coefficient of linear thermal expansion (i.e., CLTE) and retain good adhesion to a polyurethane or polyurea after aging (e.g., after climate aging). The polymeric composition may be employed in a composite material including a substrate layer that is in direct contact and bonds to a cover layer including a polyurethane, a polyurea, or both. The polymeric composition of the substrate layer preferably includes a specified amount of a polycarbonate, and a specified amount of impact modifier.

Preferably the initial adhesion between the substrate layer and the cover layer is about 2.5 MPa or more, more preferably about 3.0 MPa or more, even more preferably about 3.5 MPa or more, even more preferably about 4.0 MPa or more, and most preferably about 4.2 MPa or more (e.g., as measured using a PosiTest® AT-A Automatic Adhesion Tester as described herein). Preferably the adhesion between the substrate layer and the cover layer is durable, even after exposure to accelerated aging, such as short thermal cycling (Volkswagen PV1200 aging test, 8 cycles unless otherwise stated), hot photo-aging test (VDA 75202, 4 periods of exposure using condition type 3 unless otherwise stated), thermo-oxidative aging (240 hours at 120° C. unless otherwise stated), solar simulation test (DIN 75220 Indoor 1T, 240 hours at about 42° C. and less than about 30% relative humidity unless otherwise specified), hydrolytic testing (based on DBL 7384-8.1.18, about 72 hours at about 90° C. and at least 87% relative humidity unless otherwise specified), or any combination thereof. After exposure to such accelerated aging, the adhesion between the substrate layer and the cover layer preferably is about 2.3 MPa or more, more preferably about 2.7 MPa or more, even more preferably about 3.1 MPa or more, even more preferably about 3.5 or more, and most preferably about 3.7 MPa or more. For example, the adhesion between the cover layer and the substrate layer may initially be about 4 MPa or more and may be about 3.5 MPa or more after short thermal cycling, after hot photo-aging test, after thermos-oxidative aging, after solar simulation test, after hydrolytic testing, or any combination thereof.

Substrate Layer

The substrate layer includes, consists essentially of, or consists entirely of a polymeric composition according to the teachings herein. Preferably, some or all of a surface of the substrate layer that contacts a cover layer is formed from the polymeric composition.

Polymeric Composition

The substrate layer is formed and/or includes a polymeric composition including a plurality of polymers. Optionally, the polymeric composition includes one or more fillers. The combination of materials is selected so that the substrate layer provides the necessary bulk properties to an article (such as strength, impact resistance, low coefficient of linear thermal expansion, or any combination thereof), while maintaining adhesion to a cover layer, even after aging.

Polycarbonate

The polycarbonate preferably is an aromatic polycarbonate. Such aromatic polycarbonates may include or consist essentially of an aromatic polycarbonate described in US Patent Application Publications 2013/0196130 A1 (by Hufen et al., published Aug. 1, 2013, see e.g., paragraphs 0025 through 0053), and 2011/0129631 A1 (Van Nuffel, published Jun. 2, 2011, see e.g., paragraphs 0035 through 0058); and International Patent Application Publication WO2011/107273 (Van Nuffel et al., see e.g., page 5, lines 21 through page 9, line 23), each incorporated herein by reference in its entirety.

Suitable aromatic polycarbonates according to the teachings herein are known from the literature or can be produced by methods known from the literature (for example, for the production of aromatic polycarbonates, see Schnell, "Chemistry and Physics of Polycarbonates", Interscience Publishers, 1964, as well as U.S. Pat. Nos. 3,028,365; 4,529,791; and 4,677,162; which are hereby incorporated by reference in their entirety.

The production of aromatic polycarbonates is effected, for example, by the reaction of diphenols with carbonic acid halides, preferably phosgene, and/or with aromatic dicarboxylic acid dihalides, preferably benzenedicarboxylic acid dihalides, by the phase boundary method, optionally with the use of chain terminators, e.g., monophenols, and optionally with the use of trifunctional branching agents or branching agents with a functionality higher than three, for example triphenols or tetraphenols.

Diphenols for the production of the aromatic polycarbonates and/or aromatic polyester carbonates are preferably those of formula I:

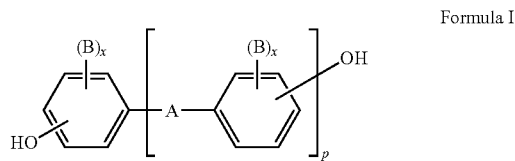

Formula I wherein A denotes a single bond, a $C_1$-$C_5$ alkylene, a $C_2$-$C_5$ alkylidene, a $C_5$-$C_6$ cycloalkylidene, —O—, —SO—, —CO—, —S—, —SO$_2$—, or a $C_6$-$C_{12}$ arylene, on to which other aromatic rings, which optionally contain hetero atoms, can be condensed, or a radical of formula II or III

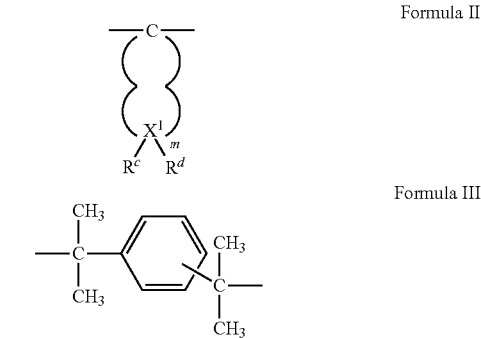

Formula II

Formula III

B in each case is independently hydrogen, a $C_1$-$C_{12}$ alkyl, preferably methyl, or a halogen, preferably chlorine and/or bromine;

x in each case is mutually independently 0, 1, or 2;

p is 0 or 1;

$R^c$ and $R^d$ are mutually independent of each other and are individually selectable for each $X^1$ and are hydrogen or a $C_1$-$C_6$ alkyl, preferably hydrogen, methyl or ethyl;

$X^1$ denotes carbon; and m denotes an integer from 4 to 7, preferably 4 or 5, with the proviso that $R^c$ and $R^d$ simultaneously denote an alkyl on at least one $X^1$ atom.

The preferred diphenols are hydroquinone, resorcinol, dihydroxybiphenyls, bis(hydroxyphenyl)-$C_1$-$C_5$ alkanes, bis (hydroxyphenyl)-$C_5$-$C_6$ cycloalkanes, bis(hydroxyphenyl)ethers, bis(hydroxyphenyl)sulfoxides, bis(hydroxyphenyl) ketones, bis(hydroxyphenyl)sulfones and alpha, alpha'-bis (hydroxyphenyl)diisopropylbenzenes, as well as derivatives thereof which have brominated and/or chlorinated nuclei.

Diphenols which are particularly preferred are 4,4'-dihydroxybiphenyl, bisphenol A, 2,4-bis(4-hydroxyphenyl)-2- methylbutane, 1,1-bis(4-hydroxyphenyl)-cyclohexane, 1,1-bis(4-hydroxyphenyl)-3,3,5-trimethylcyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl)propane, 2,2-bis-(3,5-dichloro-4-hydroxyphenyl)propane or 2,2-bis(3,5-dibromo-4-hydroxyphenyl)propane. 2,2-bis-(4-hydroxyphenyl)propane (bisphenol A) is particularly preferred. The diphenols can be used individually or as arbitrary mixtures. The diphenols are known from the literature or can be obtained by methods known from the literature.

Examples of suitable chain terminators for the production of the aromatic polycarbonates include phenol, p-chlorophenol, p-tert-butylphenol or 2,4,6-tribromophenol, as well as long chain alkylphenols such as 4-(1,3-dimethyl-butyl)-phenol or monoalkylphenols or dialkylphenols which contain a total of 8 to 20 C atoms in their alkyl substituents, such as 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. The amount of chain terminators used is generally between 0.1 mole percent and 10 mole percent with respect to the molar sum of the diphenols used in each case.

The aromatic polycarbonate preferably has a weight average molecular weights of about 10,000 or more, more preferably about 15,000 or more, even more preferably about 20,000 or more, and most preferably about 22,000 or more. The aromatic polycarbonate preferably has a weight average molecular weight of about 200,000 or less, more preferably about 100,000 or less, and most preferably about 50,000 or less. For example, the weight average molecular weight may be from about 10,000 to about 200,000, or from about 20,000 to about 80,000. Unless otherwise indicated, the references to aromatic polycarbonate and/or aromatic polyester carbonate "molecular weight" herein refer to weight average molecular weights (Mw) determined by gel permeation chromatography (GPC) using laser scattering techniques with a bisphenol A polycarbonate standard and is given in units of grams per mole (g/mole).

The aromatic polycarbonates may be linear or may be branched. Branched polycarbonates may be branched in the known manner, for example by the incorporation of 0.05 to 2.0 mole percent, with respect to the sum of the diphenols used, of trifunctional compounds or of compounds with a functionality higher than three, for example those which contain three or more phenolic groups. Branched polycarbonates suitable for the present invention may be prepared by known techniques, for example several suitable methods are disclosed in U.S. Pat. Nos. 3,028,365; 4,529,791; and 4,677,162; which are hereby incorporated by reference in their entirety.

Suitable branching agents that may be used are tri- or multi-functional carboxylic acid chlorides, such as trimesic acid trichloride, cyanuric acid trichloride, 3,3'-,4,4'-benzophenonetetracarboxylic acid tetrachloride, 1,4,5,8-naphthalene-tetracarboxylic acid tetrachloride or pyromellitic acid tetrachloride for example, in amounts of 0.01 to 1.0 mole percent (with respect to the dicarboxylic acid dichlorides used) or tri- or multi-functional phenols such as phloroglucinol, 4,6-dimethyl-2,4,6-tris(4-hydroxyphenyl)-2-heptene, 4,4-dimethyl-2,4,6-tris(4-hydroxyphenyl)heptane, 1,3,5-tris(4-hydroxyphenyl)benzene, 1,1,1-tris(4-hydroxyphenyl)ethane, tris(4-hydroxyphenyl)-phenyl-methane, 2,2-bis[4,4-bis(4-hydroxyphenyl)cyclohexyl]-propane, 2,4-bis[1-(4-hydroxyphenyl)-1-methylethyl]phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)propane, or tetrakis(4-[1-(4-hydroxyphenyl)-1-methylethyl]-phenoxyymethane in amounts of 0.01 to 1.0 mole percent with respect to the diphenols used. Phenolic branching agents can be placed in the reaction vessel with the diphenols. Acid chloride branching agents can be introduced together with the acid chlorides.

Both homopolycarbonates and copolycarbonates are suitable. For the production of copolycarbonates according to component (i) in accordance with the invention, 1 to 25 parts by weight, preferably 2.5 to 25 parts by weight (with respect to the total amount of diphenols to be used) of polydiorganosiloxanes comprising hydroxy-aryloxy terminal groups can also be used. These are known (see, for example, U.S. Pat. No. 3,419,634) or can be produced by methods known from the literature.

Apart from bisphenol A homopolycarbonates, the preferred polycarbonates are the copolycarbonates of bisphenol A with up to 15 mole percent, with respect to the molar sums of the diphenols, of other diphenols which are cited as preferred or particularly preferred, in particular 2,2-bis(3,5-dibromo-4-hydroxyphenyl)-propane.

The relative solution viscosity ($\eta_{rel}$) of the aromatic polycarbonates preferably is within the range of 1.18 to 1.4, preferably 1.22 to 1.3 (as measured on solutions of 0.5 g of polycarbonate and polyester carbonate, respectively, in 100 mL of methylene chloride at 25° C.).

Toughening Component

The toughening component includes a monovinylidene aromatic copolymer (e.g., styrene-containing copolymer) and an impact modifier. For example, the toughening component may include a rubber modified monovinylidene aromatic thermoplastic (e.g. an ABS thermoplastic).

The polymeric composition for the substrate generally includes one or more monovinylidene aromatic copolymers. The monovinylidene aromatic copolymer may be any such copolymer described herein, and preferably includes a first monomer of styrene and a second monomer of acrylonitrile. Preferably some or all of the monovinylidene aromatic copolymer is included in one or more rubber-modified monovinylidene aromatic thermoplastics. The substrate composition includes one or more rubber modified monovinylidene aromatic thermoplastics.

Examples of rubber modified monovinylidene aromatic thermoplastics include those described in US Patent Application Publications 2011/0040035 A1 (Shields et al., published Feb. 17, 2011, see e.g., paragraphs 0048 to 0087), US 2007/106028 A1 (Maes et al., published on May 10, 2007, see for example paragraphs 0010 to 0064), and International Patent Application Publication WO 2011/107273 (see e.g., page 10, line 5 to page 14, line 30, Van Nuffel et al., published on Sep. 9, 2011 and claiming priority to U.S. 61/309,634), each incorporated herein by reference in its entirety.

The rubber-modified monovinylidene aromatic thermoplastics employed in the polymeric composition typically comprise a monovinylidene aromatic and ethylenically unsaturated nitrile copolymer in a matrix or continuous phase and rubber particles dispersed in the matrix. The matrix or continuous phase of the present invention is a copolymer comprising polymerized therein a monovinylidene aromatic monomer and an ethylenically unsaturated nitrile monomer or a copolymer comprising polymerized therein a monovinylidene aromatic monomer, an ethylenically unsaturated nitrile monomer and one or more vinyl monomer that can be copolymerized with them. Copolymer, as used herein, is defined as a polymer having two or more monomers interpolymerized. These compositions are generically known as SAN-type or SAN since poly (styrene-acrylonitrile) is the most common example.

Various techniques suitable for producing rubber-modified monovinylidene aromatic thermoplastic are well known in the art. Examples of these known polymerization processes include bulk, mass-solution, or mass-suspension polymerization, generally known as mass polymerization processes. For a good discussion of how to make rubber-modified monovinylidene aromatic thermoplastic see "Modern Styrenic Polymers" of Series In Polymer Science (Wiley), Ed. John Scheirs and Duane Priddy, ISBN 0 471 497525. Also, for example, U.S. Pat. Nos. 3,660,535; 3,243,481; and 4,239,863, which are incorporated herein by reference.

In general, continuous mass polymerization techniques are advantageously employed in preparing the rubber-modified monovinylidene aromatic thermoplastic of the present invention. Preferably, the polymerization is conducted in one or more substantially linear, stratified flow or so-called "plug-flow" type reactor such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which stirred tank reactor is generally employed in combination with one or more plug-flow type reactors. Alternatively, a parallel reactor set-up, as taught in EP 412801, may also be suitable for preparing the rubber-modified monovinylidene aromatic thermoplastic of the present invention.

Multizone plug flow bulk processes include a series of polymerization vessels (or towers), consecutively connected to each other, providing multiple reaction zones. A rubber, for example butadiene rubber (stereospecific) is dissolved in a mixture of monovinylidene aromatic comonomers, for example styrene (ST) and acrylonitrile (AN), and the rubber solution is then fed into the reaction system. The polymerization can be thermally or chemically initiated, and viscosity of the reaction mixture will gradually increase. During the reaction course, the rubber will be grafted with ST/AN polymer (grafted SAN) and, in the rubber solution, bulk SAN (referred to also as free SAN or matrix SAN or non-grafted SAN) is also being formed. At a point where the free SAN (that is, non-grafted SAN) cannot be "held" in one single, continuous "phase" of rubber solution, it begins to form domains of SAN phase. The polymerization mixture now is a two-phase system. As polymerization proceeds, more and more free SAN is formed, and the rubber phase starts to disperse itself as particles (rubber domains) in the matrix of the ever-growing free SAN. Eventually, the free SAN becomes a continuous phase. This is actually a formation of an oil-in-oil emulsion system. Some matrix SAN is occluded inside the rubber particles as well. This stage is usually given a name of phase inversion. Pre-phase inversion means that the rubber is a continuous phase and that no rubber particles are formed, and post phase inversion means that substantially all of the rubber phase has converted to rubber particles and there is a continuous SAN phase. Following the phase inversion, more matrix SAN (free SAN) is formed and, possibly, the rubber particles gain more grafted SAN.

Monovinylidene aromatic monomers include but are not limited to those described in U.S. Pat. Nos. 4,666,987; 4,572,819 and 4,585,825, which are herein incorporated by reference. Preferably, the monomer is of the formula:

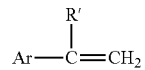

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Preferred monovinylidene aromatic monomers include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof.

Typically, such monovinylidene aromatic monomer will constitute from an amount equal to or greater than about 50 weight percent, preferably from an amount equal to or greater than about 60 weight percent, more preferably from an amount equal to or greater than about 65 weight percent, and most preferably from an amount equal to or greater than about 70 weight percent based on the total weight of the matrix copolymer. Typically, such monovinylidene aromatic monomer will constitute less than or equal to about 95 weight percent, preferably less than or equal to about 85 weight percent, more preferably less than or equal to about 80 weight percent, and most preferably less than or equal to about 75 weight percent based on the total weight of the matrix copolymer.

Unsaturated nitriles include, but are not limited to, acrylonitrile, methacrylonitrile, ethacrylonitrile, fumaronitrile and mixtures thereof. The unsaturated nitrile is generally employed in the matrix copolymer in an amount equal to or greater than about 5 weight percent, preferably in an amount equal to or greater than about 10 weight percent, more preferably in an amount equal to or greater than about 15 weight percent, and most preferably in an amount equal to or greater than about 20 weight percent based on the total weight of the matrix copolymer. The unsaturated nitrile is generally employed in the matrix copolymer in an amount less than or equal to about 50 weight percent, preferably equal to or less than about 45 weight percent, more preferably less than or equal to about 35 weight percent, and most preferably less than or equal to about 30 weight percent based on the total weight of the matrix copolymer.

Other vinyl monomers may also be included in polymerized form in the matrix copolymer, including conjugated 1,3 dienes (for example, butadiene, isoprene, etc.); alpha- or beta-unsaturated monobasic acids and derivatives thereof (for example, acrylic acid, methacrylic acid, etc., and the corresponding esters thereof such as methylacrylate, ethylacrylate, n-butyl acrylate, iso-butyl acrylate, methyl methacrylate, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (NPMI), etc.; and the like. These additional comonomers can be incorporated in to the composition in several ways including, interpolymerization with the monovinylidene aromatic and ethylenically unsaturated nitrile matrix copolymer and/or polymerization into polymeric components which can be combined, for example, blended in to the matrix. If present, the amount of such comonomers will generally be equal to or less than about 20 weight percent, more preferably equal to or less than about 10 weight percent and most preferably less than or equal to about 5 weight percent based on the total weight of the matrix copolymer. The matrix copolymer preferably is substantially free of or even entirely free of maleic anhydride and carboxylic acid groups (e.g., the amount of maleic anhydride, maleic acid, or other monomers resulting in a carboxylic acid group preferably is about 4 wt. % or less, more preferably about 0.9 wt. % or less, even more preferably about 0.25 wt % or less, and most preferably about 0 wt. %, based on the total weight of the styrenic copolymer).

The matrix copolymer is present in an amount equal to or greater than about 60 weight percent, preferably equal to or greater than about 70 weight percent, more preferably equal to or greater than about 75 weight percent, even more preferably equal to or greater than about 80 weight percent and most preferably equal to or greater than about 82 weight percent based on the weight of the rubber-modified monovinylidene aromatic thermoplastic. The matrix copolymer is present in an amount equal to or less than about 90.5 weight percent, preferably equal to or less than about 90 weight percent, more preferably equal to or less than about 89 weight percent, and most preferably equal to or less than about 88 weight percent based on the weight of the rubber-modified monovinylidene aromatic thermoplastic.

Various rubbers are suitable for use in the present invention. The rubbers include diene rubbers, ethylene propylene rubbers, ethylene propylene diene (EPDM) rubbers, ethylene copolymer rubbers, acrylate rubbers, polyisoprene rubbers, halogen containing rubbers, and mixtures thereof. Also suitable are interpolymers of rubber-forming monomers with other copolymerizable monomers.

Preferred rubbers are diene rubbers such as polybutadiene, polyisoprene, polypiperylene, polychloroprene, and the like or mixtures of diene rubbers, that is, any rubbery polymers of one or more conjugated 1,3-dienes, with 1,3-butadiene being especially preferred. Such rubbers include homopolymers and copolymers of 1,3-butadiene with one or more copolymerizable monomers, such as monovinylidene aromatic monomers as described hereinabove, styrene being preferred. Preferred copolymers of 1,3-butadiene are block or tapered block rubbers of at least about 30 weight percent 1,3-butadiene rubber, more preferably from about 50 weight percent, even more preferably from about 70 weight percent, and most preferably from about 90 weight percent 1,3-butadiene rubber and up to about 70 weight percent monovinylidene aromatic monomer, more preferably up to about 50 weight percent, even more preferably up to about 30 weight percent, and most preferably up to about 10 weight percent monovinylidene aromatic monomer, weights based on the weight of the 1,3-butadiene copolymer.

Filler

The polymeric composition may be substantially free of or entirely free of filler so that the low density of the selected polymers is generally maintained. For example, the concentration of filler may be about 20 weight percent or less, about 15 weight percent or less, about 10 weight percent or less, or about 3 weight percent or less.

If employed, the fillers preferably include or consist essentially of reinforcing fillers, such as fibers having a length to diameter ratio of about 4 or more. The amount of other fillers (e.g., non-reinforcing fillers, such as talc, clay, etc.) preferably is about 6 weight percent or less, about 4 weight percent or less, about 2 weight percent or less, or about 1 weight percent or less, based on the total weight of the polymeric composition.

A reinforcing filler may be employed for improving the strength of the polymeric composition and/or for reducing the coefficient of linear thermal expansion of the composition.

The reinforcing filler may include a glass fiber, a carbon fiber, a metal fiber, or any combination thereof. Other reinforcing fillers include mineral fillers having a needle-like shape, such as wollastonite.

The reinforcing filler may include one or more acicular fillers. Preferred fillers are elongated particles have an aspect ratio (e.g., ratio of length to diameter) of about 2 or more, more preferably about 3 or more, and even more preferably about 4 or more, and most preferably about 6 or more. The aspect ratio of the filler may be about 1000 or less, about 40 or less, about 30 or less, or about 20 or less, or about 15 or less. A particularly preferred acicular filler is an acicular wollastonite. Wollastonite is a calcium metasilicate (i.e., $CaSiO_3$). Preferred wollastonites consist substantially of $CaSiO_3$. The amount of any impurity (e.g., the total amount of oxides other those of calcium and silicon) preferably is about 10 weight percent or less, more preferably about 7 weight percent or less, even more preferably about 5 weight percent or less, and most preferably about 3 weight percent or less.

The amount of any Mg in the filler preferably is about 1 weight percent or less, more preferably about 0.5 weight percent or less, and most preferably about 0.2 weight percent or less, based on the total weight of the filler.

The filler may be treated or untreated. For example, the filler may include a sizing for improving the adhesion of the filler to one or more of the polymers of the thermoplastic composition. Preferred wollastonites include a sizing.

The acicular filler preferably has a hardness of about 3 Mohs or more, more preferably about 3.5 Mohs or more, and most preferably about 4 Mohs or more. The filler preferably has a hardness of about 8 Mohs or less, more preferably about 6 Mohs or less, and most preferably about 5 Mohs or less. The acicular filler (e.g., the wollastonite may have one or any combination of the following features: a specific gravity from about 2.5 to about 3.5 (preferably from about 2.7 to about 3.1, more preferably about 2.90 $g/cm^3$); a median length of about 25 µm to about 150 µm, (e.g., about 40 µm to about 75 µm, preferably about 50 µm or about 63 µm); a median diameter of about 1 to about 20 µm, preferably about 2 to about 10 µm, and more preferably about 4 µm to about 8 µm); a percentage of particles having a diameter from about 2.0 µm to about 20 µm of about 50% or more (e.g., about 70% or more, or about 80% to about 100%); a specific surface area from about 0.5 $m^2/g$ to about 10 $m^2/g$ (e.g., about 2.9 $m^2/g$, as measured by BET); a pH from about 7 to about 13 (e.g., about 9.9) in a 10% slurry; or any combination thereof. Preferred wollastonites Includes (e.g., about 80% or more, or about 90% or more, or about 95% or more) calcium metasllicate (i.e., $CaSiO_3$).

Examples of fillers which may be employed include NYGLOS® 4W and NYGLOS® 4W 10992 wollastonite commercially available from NYCO MINERALS. NYGLOS® 4W has a specific gravity of about 2.90 g/cm$^3$; a median length of about 63 μm; a median diameter of about 4 μm to about 8 μm; a percentage of particles having a diameter from about 2.0 μm to about 20 μm of about 80% to about 100%; a specific surface area of about 2.9 m$^2$/g, as measured by BET; a pH of about 9.9 in a 10% slurry; and a hardness (Mohs) of about 4.5. These wollastonites Include about 95% or more calcium metasllicate (i.e., CaSiO$_3$). NYGLOS® 4W has an aspect ratio of about 11:1. The amount of Mg is about 0.2 weight percent or less, based on the total weight of the wollastonite.

The polymeric composition includes a plurality of polymers. As discussed hereinbefore, the plurality of polymers includes the polycarbonate and the toughening component which preferably includes or is an acrylonitrile-butadiene-styrene thermoplastic (preferably, the mass ABS), and optionally acrylonitrile-styrene copolymer. Although the polymeric composition may include additional polymers, these are typically present as minor components in the polymeric composition. Preferably, the total amount of the polycarbonate, the acrylonitrile-butadiene-styrene thermoplastic (e.g., the mass ABS) and any acrylonitrile-styrene copolymer is about 70 weight percent or more, more preferably about 80 weight percent or more, even more preferably about 90 weight percent or more, and most preferably about 95 weight percent or more, and is about 100 weight percent or less, based on the total weight of the plurality of polymers in the polymeric composition.

The total weight of the polymers in the polymeric composition preferably is about 75 weight percent or more, more preferably about 83 weight percent or more, and most preferably about 88 weight percent or more. The total weight of the polymers in the polymeric composition may be about 100 weight percent or less, about 99 weight percent or less, or about 98 weight percent or less, based on the total weight of the polymeric composition.

The polycarbonate (e.g., the aromatic polycarbonate) preferably is present in an amount of about 10 weight percent or more, more preferably about 20 weight percent or more, even more preferably about 25 weight percent or more, even more preferably about 28 weight percent or more, and most preferably about 30 weight percent or more, based on the total weight of the polymeric composition, and/or based on the total weight of the polymers in the polymeric composition. The polycarbonate preferably is present in an amount of about 55 weight percent or less, more preferably about 54 weight percent or less, even more preferably about 53 weight percent or less, even more preferably about 50 weight percent or less, even more preferably about 48 weight percent or less, even more preferably about 45 weight percent or less, even more preferably about 42 weight percent or less, and most preferably about 40 weight percent or less, based on the total weight of the polymeric composition, and/or based on the total weight of the polymers in the polymeric composition. For example, the amount of the polycarbonate may be from about 20 weight percent to about 55 weight percent, from about 30 to about 50 weight percent, from about 28 weight percent to about 48 weight percent, from about 25 to about 50 weight percent, or from about 30 to about 55 weight percent, based on the total weight of the polymeric composition.

The amount of the toughening component in the polymeric composition including the rubber-modified monovinylidene aromatic thermoplastic (e.g., the amount of the ABS thermoplastic) and any additional impact modifier and/or styrene-acrylonitrile copolymer preferably is about 90 weight percent or less, more preferably about 80 weight percent or less, even more preferably about 75 weight percent or less, and most preferably about 70 weight percent or less, based on the total weight of the polymeric composition and/or based on the total weight of the polymers in the polymeric composition. The toughening component preferably is present in an amount of about 40 weight percent or more, more preferably about 45 weight percent or more, even more preferably about 50 weight percent or more, and most preferably 55 weight percent or more, based on the total weight of the polymeric composition and/or based on the total weight of the polymers in the polymeric composition.

The weight ratio of the polycarbonate component (i.e., the polycarbonate) to the toughening component preferably is about 10:90 or more, more preferably about 20:80 or more, and most preferably about 25:75 or more. The weight ratio of the polycarbonate component (i.e., the polycarbonate) to the toughening component preferably is about 55:45 or less, more preferably about 50:50 or less, and most preferably about 45:55 or less.

The concentration of the impact modifier (e.g., the polybutadiene) preferably is about 3 weight percent or more, more preferably about 5 weight percent or more, and most preferably about 7 weight percent or more, based on the total weight of the polymeric composition. The concentration of the impact modifier (e.g., the polybutadiene) preferably is about 23 weight percent or less, more preferably about 18 weight percent or less, even more preferably about 15 weight percent or less, and most preferably about 13 weight percent or less, based on the total weight of the polymeric composition.

If employed, any additional styrene-acrylonitrile copolymer (i.e., other than the copolymer in the rubber-modified monovinylidene aromatic thermoplastic), preferably is about 25 weight percent or less, more preferably about 20 weight percent or less, even more preferably about 15 weight percent or less, and most preferably about 10 weight percent or less, based on the total weight of the thermoplastic composition. Such additional styrene-acrylonitrile copolymer may be present in an amount of about 0 weight percent or more. The ratio of the weight of such additional styrene-acrylonitrile copolymer to the weight of the rubber-modified monovinylidene aromatic thermoplastic preferably is about 1.0 or less, more preferably about 0.8 or less, even more preferably about 0.6 or less, and most preferably about 0.45 or less.

In one aspect of the invention, some or all of the rubber-modified monovinylidene aromatic thermoplastic may be replaced with the combination of i) a styrene-acrylonitrile copolymer (such as described herein) and ii) a rubber modifier. Preferably, the amount of the rubber modifier is from about 2 weight percent to about 30 weight percent, more preferably from about 3 weight percent to about 20 weight percent, and most preferably from about 3 weight percent to about 15 weight percent, based on the total weight of the styrene-acrylonitrile copolymer and the rubber modifier. The rubber modifier may include any polymer having a glass transition temperature of about 0° C. or less. The rubber modifier preferably imparts ductility to the styrene-acrylonitrile copolymer. A particularly preferred rubber modifier includes butadiene monomer, styrene monomer, or both. Another particularly preferred rubber is an acrylic rubber, such as a rubber including or consisting essentially of butyl acrylate or ethylhexylacrylate. The rubber modifier may include a sufficient amount of styrene for improving the compatibility of the rubber modifier with the styrene-acrylonitrile copolymer. The rubber modifier preferably is a copolymer including butadiene and styrene. The rubber modifier may be a core shell polymer. The core preferably includes an elastomeric polymer and the shell preferably includes a polymer having a melting temperature and/or a glass transition temperature greater than about 100° C. For example, the rubber modifier may include a core including or consisting essentially of a polymer including butadiene and styrene. As another example, the core may include one or more acrylic rubbers, such as a rubber including butylacrylate, or ethylhexylacrylate, The rubber modifier may have a shell including an acrylate monomer. The rubber modifier may have a shell including polymethyl methacrylate. The rubber modifier may be a core shell MBS modifier including a poly (butadiene/styrene) core and a polymethyl methacrylate shell. Examples of core-shell impact modifiers that may be employed as the rubber modifier include PARALOID™ impact modifiers commercially available from THE DOW CHEMICAL COMPANY. The rubber modifier may be provided as an emulsion ABS and/or a grafted rubber concentrate. The amount of elastomer in the grafted rubber concentrates preferably is about 20 weight percent or more, more preferably about 30 weight percent or more, even more preferably about 45 weight percent or more, and most preferably about 55 weight percent or more, based on the total weight of the grafted rubber concentrate. The grafted rubber concentrate may be grafted on an SAN copolymer (e.g., produced by an emulsion process). The grafted rubber concentrate may consist essentially of (i.e., about 95 weight percent or more), or entirely of one or more elastomers (e.g., butadiene) and one or more styrene containing polymers (e.g., SAN). The grafted rubber concentrate may be added separately to the polymeric composition, e.g., with additional SAN. The grafted rubber concentrate may be mixed with additional styrene containing polymer (e.g., SAN) prior to adding to the polymeric composition. The amount of toughening component that is other than mass ABS (e.g., GRC or core-shell copolymer) preferably is less than 60 weight percent, more preferably less than 40 weight percent, even more preferably less than 25 weight percent, based on the total weight of the toughening component.

The amount of the reinforcing filler (e.g., the amount of wollastonite and/or glass fiber) preferably is about 3 weight percent or more, more preferably about 4 weight percent or more, even more preferably about 5 weight percent or more and most preferably about 6 weight percent or more, based on the total weight of the polymeric composition. The amount of the reinforcing filler (e.g., the amount of the wollastonite and/or glass fiber) preferably is about 25 weight percent or less, more preferably about 20 weight percent or less, even more preferably about 17 weight percent or less, even more preferably about 14 weight percent or less, and most preferably about 11 weight percent or less, based on the total weight of the polymeric composition. For example, the reinforcing filler may be present in an amount from about 3 weight percent to about 25 weight percent, about 5 weight percent to about 14 weight percent, about 4 weight percent to about 11 weight percent, or about 3 weight percent to about 14 weight percent, based on the total weight of the polymeric composition.

The total amount of rubber-modified monovinylidene aromatic thermoplastic, polycarbonate and any additional styrene-acrylonitrile copolymer in the polymeric composition preferably is about 70 weight percent or more, more preferably about 80 weight percent or more, even more preferably about 90 weight percent or more, and most preferably about 95 weight percent or more, based on the total weight of the polymers in the polymeric composition. The total amount of rubber-modified monovinylidene aromatic thermoplastic, polycarbonate and any additional styrene-acrylonitrile copolymer in the polymeric composition may be about 100 weight percent or less, based on the total weight of polymers in the polymeric composition. Preferably, the total amount of rubber-modified monovinylidene aromatic thermoplastic, polycarbonate and any additional styrene-acrylonitrile copolymer in the polymeric composition is about 50 weight percent or more, more preferably about 65 weight percent or more, more preferably about 77 weight percent or more, and most preferably about 82 weight percent or more, based on the total weight of the polymeric composition. Preferably, the total amount of rubber-modified monovinylidene aromatic thermoplastic, polycarbonate and any additional styrene-acrylonitrile copolymer in the polymeric composition is about 97 weight percent or less, more preferably about 95 weight percent or less, even more preferably about 92 weight percent or less, and most preferably about 89 weight percent or less, based on the total weight of the polymeric composition.

The total amount of the reinforcing filler, the rubber-modified monovinylidene aromatic thermoplastic, the polycarbonate and any additional styrene-acrylonitrile copolymer in the polymeric composition preferably is about 80 weight percent or more, more preferably about 90 weight percent or more, even more preferably about 95 weight percent or more, and most preferably about 97 weight percent or more, based on the total weight of the polymeric composition. The total amount of the reinforcing filler, the rubber-modified monovinylidene aromatic thermoplastic, the polycarbonate and any additional styrene-acrylonitrile copolymer in the polymeric composition may be about 100 weight percent or less, based on the total weight of the polymeric composition.

The polymeric composition may optionally include one or more additional polymers, such as described herein. Examples of additional polymers include olefinic copolymers (e.g., including 50 weight percent or more ethylene and/or propylene), polyesters, and polyamides.

Olefinic Copolymer

Olefinic copolymers that may be employed include polyolefin copolymers having one or more functional group including an oxygen atom and/or a nitrogen atom. Preferred olefinic copolymers include one or more alpha-olefins in an amount of about 50 weight percent or more of one, more preferably about 60 weight percent or more, and most preferably about 65 weight percent or more. The olefinic copolymer preferably includes one or more comonomers having at least one oxygen atom. As used herein, olefinic copolymers are substantially free of maleic anhydride and carboxylic acid groups (e.g., the amount of maleic anhydride, maleic acid, or other monomers resulting in a carboxylic acid group preferably is about 4 wt. % or less, more preferably about 0.9 wt. % or less, and most preferably about 0.25 wt. % or less, based on the total weight of the olefinic copolymer). Preferred comonomers include acrylates and acetates, For example the olefinic copolymer may be an ethylene-acrylate copolymer. A particularly preferred olefinic copolymer is Amplify AE ethylene acrylate copolymer. If employed, the amount of the olefinic copolymer preferably is about 25 weight percent or less, more preferably about 20 weight percent or less, even more preferably about 12 weight percent or less, and most preferably about 8 weight percent or less, based on the total weight of the polymeric composition. The amount of the olefinic copolymer may be about 0 weight percent or more.

Polyester

The polymeric composition (e.g., of the substrate layer) may include one or more polyesters. Examples of polyesters that may be employed include aromatic polyesters, such as polyalkylene terephthalates. Examples of polyesters that may be used include polyesters described in US Patent Application Publication 2013/0196130 A1 (by Hufen et al., published Aug. 1, 2013, see e.g., paragraphs 0123 through 0132), incorporated herein by reference. The polymeric composition preferably is substantially or entirely free of polyester. If present, the total amount of polyester preferably is about 10 weight percent or less, more preferably about 5 weight percent or less, even more preferably about 2 weight percent or less, even more preferably about 1.9 weight percent or less, even more preferably about 1.0 weight percent or less, and most preferably about 0.4 weight percent or less, based on the total weight of the polymeric composition. For example, the total amount of polyester may be from about 0 weight percent to about 10 weight percent, from about 0 weight percent to about 1.9 weight percent, or from about 0 weight percent to about 0.4 weight percent, based on the total weight of the polymeric composition.

Polyamide

The polymeric composition (e.g., of the substrate layer) may optionally include one or more polyamides. The polyamide may be of any type. Suitable polyamides include reaction products of a diamine and a diacid, and monadic polyamides. Polyamides which are formed from a diamine and a diacid may include polyamides (e.g., nylons) containing reaction products of either adipic acid or terephthalic acid with a diamine. Examples of monadic polyamides include nylon 6, and poly(p-benzamide). Nylons which may be used in the present invention include nylon 3, nylon 4, nylon 5, nylon 6, nylon 6T, nylon 66, nylon 6/66, nylon 6/66/610, nylon 610, nylon 612, nylon 69, nylon 7, nylon 77, nylon 8, nylon 9, nylon 10, nylon 11, nylon 12, and nylon 91. Copolymers containing any of the above mentioned polyamides may also be used. Polyamide copolymers may include a polyether. Polyamide copolymers may be random copolymers, block copolymers, a combination thereof. The polymeric composition preferably is substantially or entirely free of polyamides. If present, the total amount of polyamide preferably is about 3 weight percent or less, more preferably about 2 weight percent or less, even more preferably about 1.9 weight percent or less, even more preferably about 1.0 weight percent or less, and most preferably about 0.4 weight percent or less, based on the total weight of the polymeric composition. For example, the total amount of polyamide may be from about 0 weight percent to about 3 weight percent, from about 0 weight percent to about 1.9 weight percent, or from about 0 weight percent to about 0.4 weight percent, based on the total weight of the polymeric composition.

Additives

The polymeric composition may include one or more additives. For example, the polymeric composition may include one or more stabilizers (e.g., heat stabilizer, light stabilizer, antioxidant, or UV stabilizers), one or more colorants, one or more process aids, one or more flame retardants, one or mold release agents, one or more antistatic agents, one or more conductivity additives, one or more additives for improving scratch resistance, or one or more anti-dripping agents. Examples of additives that may be employed include the additives described in US Patent Application Publication 2013/0196130 A1 (by Hufen et al., published Aug. 1, 2013, see e.g., paragraphs 0144 through 0147), incorporated herein by reference.

Preferred additives include additives commonly employed in polycarbonate compositions and/or additives commonly employed in polystyrene and/or ABS compositions.

Preferred antioxidants include sterically hindered phenolic antioxidant. A particularly preferred antioxidant is octadecyl-3-(3,5-di-tert.butyl-4-hydroxyphenyl)-propionate, such as IRGANOX® 1076 (CAS #2082-79-3) commercially available from BASF.

Preferred mold release agents include polyol ester type mold release agents. A particular preferred mold release agent is LOXIOL® P 861/3.5 commercially available from SAFICALCAN NECARBO BV. Another particularly preferred mold release agent is LOXIOL® VPG 861 commercially available from EMERY OLEOCHEMICALS LLC (CINCINNATI, OH).

If present, the total amount of the one or more additives preferably is about 10 weight percent or less, more preferably about 5 weight percent or less, and most preferably about 2.5 weight percent or less, based on the total weight of the polymeric composition. The total amount of the one or more additive may be about 0 weight percent or more, about 0.1 weight percent or more, or about 0.3 weight percent or more.

The polymeric composition preferably is substantially free of or even entirely free of polymers including maleic anhydride and carboxylic acid groups (e.g., maleic anhydride, maleic acid, or other monomers resulting in a carboxylic acid group). Without being bound by theory, it is believed that poor durability (e.g., after humidity and/or climate aging) when such monomers are present is related to an oxidation and/or degradation of the material. Preferably, the amount of any polymer including such monomer is about 1.2 wt. % or less, more preferably about 0.9 wt. % or less, even more preferably about 0.25 wt % or less, and most preferably about 0 wt. %, based on the total weight of styrene copolymer, or based on the total weight of the polymeric composition, or based on the total weight of the substrate layer.

The polymeric composition may be formed into a substrate layer by any means. For example, the substrate layer may be formed by molding (e.g., injection molding, compression molding, overmolding, or co-injection molding), extrusion (e.g., profile extrusion, or sheet extrusion, or blown film extrusion), calendaring, a 3-D printing method, or any other method known in the processing of polymeric materials. The substrate layer may have any thickness. The thickness of the substrate typically depends on the requirements of the particular application. Preferably, the substrate layer has a thickness of about 0.2 mm or more, more preferably about 0.5 mm or more, even more preferably about 1.0 mm or more, and most preferably about 2.0 mm or more. The thickness of the substrate layer preferably is about 30 mm or less, more preferably about 20 mm or less, even more preferably about 20 mm or less, even more preferably about 10 mm or less, and most preferably about 8 mm or less. It will be appreciated that the thickness of the substrate may be uniform or may vary. If the thickness of the substrate varies, the above thickness values refer to the average thickness of the substrate in the regions to be adhered to a cover layer.

The substrate layer preferably is a dense material (e.g., having a porosity of 10 volume percent or less, preferably about 3 volume percent or less, and most preferably about 0.8 volume percent or less). The amount of porosity in the dense substrate layer may be 0 volume percent or more, or about 0.3 volume percent or more. It has been found that by using dense substrate, the thickness of the substrate layer and/or the total weight of the substrate layer may be reduced. The use of a dense substrate presents additional challenges with respect to adhesion and durability. Without being bound by theory, it is believed that the porosity of a foamed substrate layer may provide a means for mechanical attachment of the layers and/or may provide for a means for absorbing energy during durability testing. Preferably the substrate layer is made without the use of foaming agents (e.g., physical foaming agents or chemical foaming agents). As such, the resulting substrate layer preferably is free of residual foaming agents or by-products thereof. Although a dense material for the substrate is preferred, it will be appreciated that the teachings herein may also be employed when the substrate layer is a foamed material (e.g., having a porosity of greater than 10 volume percent, preferably about 20 volume percent or more, and most preferably about 40 volume percent or more). Foamed substrate layers may have a porosity of about 75 volume percent or less, about 60 volume percent or less, or about 50 volume percent or less.

The substrate layer may be colored, clear, or transparent. For example, the substrate layer may include one or more colorants to provide a predetermined color to the substrate. The use of a colored substrate layer may be particularly advantageous in articles having a transparent or clear cover layer.

Properties

The polymeric compositions according to the teachings herein preferably have a coefficient of linear thermal expansion of about $75 \times 10^{-6}$ cm/cm/° C. or less, more preferably $65 \times 10^{-6}$ cm/cm/° C. or less, even more preferably about $60 \times 10^{-6}$ cm/cm/° C. or less, even more preferably about $50 \times 10^{-6}$ cm/cm/° C. or less, and most preferably about $40 \times 10^{-6}$ cm/cm/° C. or less, as measured from −30° C. to 30° C. The polymeric composition may have a coefficient of linear thermal expansion of about $5 \times 10^{-6}$ cm/cm/° C. or more, or about $20 \times 10^{-6}$ cm/cm/° C. or more.

The polymeric composition preferably has one or more, or all of the following features: a Notched Charpy impact strength from about 8 to about 40 kJ/m2, as measured according to ISO179-1eA; a tensile modulus from about 2000 to about 6000 MPa (polymeric compositions including a filler, such as wollastonite and/or glass fibers preferably have a modulus of about 3000 MPa or more), as measured according to ISO527; or an elongation at break from about 5 to about 80 percent (polymeric compositions including a filler preferably have an elongation at break of less than 40 percent) percent, as measured according to ISO527.

Cover Layer

The articles according to the teachings herein include a cover layer over the substrate layer. The cover layer covers some or all of a surface of the substrate layer. Preferably the cover layer directly contacts the substrate layer and bonds to the substrate layer in the regions of contact.

The cover layer may have any thickness, but preferably has a thickness that is less than the thickness of the substrate layer. As such, the substrate layer may provide one or more advantageous properties to the "bulk" of the article, whereas the cover layer may provide one or more properties to a surface of the article. Preferably, the cover layer has a thickness of about 0.15 mm or more, more preferably about 0.30 mm or more, even more preferably about 0.5 mm or more, and most preferably about 0.6 mm or more. The cover layer preferably has a thickness of about 3 mm or less, more preferably about 1.5 mm or less, and most preferably about 1.0 mm or less.

The cover layer may be applied to the substrate layer according to any known method. The cover layer may be formed from a material that includes a polymer, a prepolymer, a monomer, or any combination thereof. Preferably, the cover layer is formed from a composition that is polymerized and/or cross-linked after being applied to a surface of the substrate layer. Preferred methods for applying the cover layer include a molding step (e.g., overmolding).

The process for applying the cover layer may include a step injecting a polymerizable composition into a mold and at least partially polymerizing the polymerizable composition for forming a polyurethane and/or a polyurea. The polymerizable composition may pass through a static mixer prior to entering a mold cavity. The mold cavity preferably includes the substrate layer with a gap above a surface of the substrate layer. When the polymerizable composition is injected into the mold, it contacts at least a portion of the surface of the substrate layer. The polymerizable composition preferably is maintained in the mold cavity until some or all of the material polymerizes. When the polymerizable composition contacts the surface of the substrate layer, the substrate layer preferably is at a temperature below a glass transition temperature of the polymeric composition (e.g., below the glass transition temperature of the polycarbonate).

The cover layer may be provided as a multicomponent system having two or more components, or three or more components. For example, the systems may include a first component and a second component which are individually stable and polymerize when combined. The cover layer may be prepared by injecting each of the components into a mold. The components may be mixed before being injected, may be mixed during injection (e.g., using a mixing head), or may be mixed in the mold. Preferably, the components are mixed during injection of the materials into the mold, such as by the use of a mixing head (e.g., a dynamic or static mixing head).

The cover layer preferably is molded as a room temperature liquid (e.g., being applied at room temperature or at an elevated temperature). Preferably the polymerizable composition rapidly polymerizes in the mold so that the composite part can be removed from the mold in a reasonable time. Preferably the polymerization time (i.e., the time for the cover layer to develop sufficient strength for removing the part from the mold) is about 50 minutes or less, more preferably about 20 minutes or less, even more preferably about 7 minutes or less, even more preferably about 3 minutes or less, and most preferably about 1 minute or less. The polymerizable composition may be injected into a mold at room temperature or at an elevated temperature. The mold temperature should be sufficiently low so that the polymerizable composition can be substantially or entirely fill the cavity of the mold. Preferably the mold temperature is about 170° C. or less, more preferably about 130° C. or less, even more preferably about 110° C. or less, and most preferably about 100° C. or less. The mold temperature should be sufficiently high so that the polymerization occurs in a reasonable time. Preferably the mold temperature is about 15° C. or more, more preferably about 25° C. or more, even more preferably about 35° C. or more, even more preferably about 45° C. or more, and most preferably about 55° C. or more.

Preferably the polymerizable composition is substantially or entirely free of volatile organic compounds. Preferably the polymerizable composition is free of hazardous air pollutants. Preferably, the polymerization of the polymerizable composition does not produce volatile organic compounds. Preferably the polymerizable composition is selected so that it becomes tack-free in about 10 minutes or less, more preferably about 4 minutes or less, even more preferably about 2 minutes or less, and most preferably in about 60 seconds or less (e.g., at a processing temperature of about 20° C. to about 50° C., about 50° C. to about 80° C., or about 80° C. to about 110° C.).

The cover layer may be a compact material or may be a foamed material. Preferred cover layers are compact (i.e., a dense material having a porosity of about 20 volume percent or less, preferably about 10 volume percent or less, and more preferably about 5 volume percent or less).

The cover layer preferably includes, or consists essentially of a polyurethane, a polyurea, or both that contacts and bonds to the substrate layer.

The cover layer may include a polyurethane including one or any combination of the features described in US Patent Application Publication 2013/0196130 A1 (by Hufen et al., published Aug. 1, 2013, see e.g., paragraphs 0173 through 0240), incorporated herein by reference. The cover layer may include a polyurethane or a polyurea, such as those described in US Patent Application Publication 2011/0135934 A1 (Seidel et al., published on Jun. 9, 2011, see paragraphs 0172 through 0219), U.S. Patent Application Publication 2002/0058716 A1 (Wittmann et al., published on May 16, 2002, see paragraphs 0117 to 0151), U.S. Pat. No. 5,192,814A (Oshima et al., published on Mar. 9, 1993), U.S. Pat. No. 4,764,540 (Aug. 16, 1988, see column 2, line 43 through column 10, line 32 and the examples), and U.S. Pat. No. 5,331,051 (Issued Jul. 19, 1994, see column 2, line 5 to column 6, line 42 and examples), the contents of which are all incorporated herein by reference.

Preferred polyureas include one or more repeat units having the following structure:

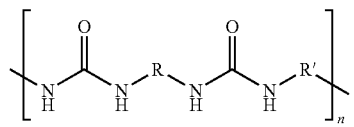

The polyurea may be a reaction product including one or more isocyanate compounds and one or more amine compounds. The isocyanate containing compounds preferably includes 2 or more isocyanate functional groups (e.g., the isocyanate containing compounds may including diisocyanate(s), polyisocyanates including 3 or more isocyanate groups, or any combination thereof). The amine compounds preferably include 2 or more amine groups. For example, the amine compounds may include diamine(s), polyamines including 3 or more amines, or any combination thereof. Preferred isocyanates include aromatic isocyanates, aromatic isocyanates, or combinations thereof.

The polyurethanes employed according to the invention are obtained by reaction of polyisocyanates with H-active polyfunctional compounds, preferably polyols. In this context, the term "polyurethane" is understood in the context of this invention as also meaning polyurethane-ureas, in which those compounds with N—H functionality, optionally in a mixture with polyols, are employed as H-active polyfunctional compounds.

Suitable polyisocyanates are the aromatic, araliphatic, aliphatic or cycloaliphatic polyisocyanates known per se to the person skilled in the art having an NCO functionality of preferably ≥2, which can also contain iminooxadiazinedione, isocyanurate, uretdione, urethane, allophanate, biuret, urea, oxadiazinetrione, oxazolidinone, acylurea and/or carbodiimide structures. These can be employed individually or in any desired mixtures with one another.

In this context, the abovementioned polyisocyanates are based on di- and triisocyanates which are known per se to the person skilled in the art and have aliphatically, cycloaliphatically, araliphatically and/or aromatically bonded isocyanate groups, it being irrelevant whether these have been prepared using phosgene or by phosgene-free processes. Examples of such di- and triisocyanates are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophoronediisocyanate, IPDI), 4,4'-di-isocyanatodicyclohexylmethane (Desmodur® W, Bayer AG, Leverkusen, DE), 4-isocyanatomethyl-1,8-octane-diisocyanate (triisocyanatononane, TIN), ω,ω'-diisocyanato-1,3-dimethylcyclohexane (H6XDI), 1-isocyanato-1-methyl-3-isocyanatomethylcyclohexane, 1-isocyanato-1-methyl-4-isocyanatomethylcyclohexane, bis-(isocyanatomethylynorbornane, 1,5-naphthalene-diisocyanate, 1,3- and 1,4-bis-(2-isocyanatoprop-2-yl)-benzene (TMXDI), 2,4- and 2,6-diisocyanatotoluene (TDI), in particular the 2,4 and the 2,6 isomer and technical grade mixtures of the two isomers, 2,4'- and 4,4'-diisocyanatodiphenylmethane (MDI), polymeric MDI (pMDI), 1,5-diisocyanatonaphthalene, 1,3-bis(isocyanatomethyl)benzene (XDI) and any desired mixtures of the compounds mentioned.

In this context, the polyisocyanates preferably have an average NCO functionality of from 2.0 to 5.0, preferably from 2.2 to 4.5, particularly preferably from 2.2 to 2.7, and a content of isocyanate groups of from 5.0 to 37.0 wt. %, preferably from 14.0 to 34.0 wt. %.

In a preferred aspect, polyisocyanates or polyisocyanate mixtures of the abovementioned type with exclusively aliphatically and/or cycloaliphatically bonded isocyanate groups are employed.

More preferably, the polyisocyanates of the abovementioned type are based on hexamethylene-diisocyanate, isophorone-diisocyanate, the isomeric bis-(4,4'-isocyanatocyclohexyl)-methanes and mixtures thereof Among the higher molecular weight, modified polyisocyanates, the prepolymers known from polyurethane chemistry having terminal isocyanate groups of the molecular weight range of 400 to 15,000, preferably 600 to 12,000 are of interest in particular. These compounds are prepared in a manner known per se by reaction of excess amounts of simple polyisocyanates of the type mentioned by way of example with organic compounds having at least two groups which are reactive towards isocyanate groups, in particular organic polyhydroxy compounds. Suitable such polyhydroxy compounds are both simple polyfunctional alcohols of the molecular weight range of 62 to 599, preferably 62 to 200, such as e.g. ethylene glycol, trimethylolpropane, propane-1,2-diol or butane-1,4-diol or butane-2,3-diol, but in particular higher molecular weight polyether polyols and/or polyester polyols of the type known per se from polyurethane chemistry with molecular weights of from 600 to 12,000, preferably 800 to 4,000, which have at least two, as a rule 2 to 8, but preferably 2 to 6 primary and/or secondary hydroxyl groups. Those NCO prepolymers which have been obtained, for example, from low molecular weight polyisocyanates of the type mentioned by way of example and less preferred compounds having groups which are reactive towards isocyanate groups, such as e.g. polythioether polyols, polyacetals containing hydroxyl groups, polyhydroxypolycarbonates, polyester-amides containing hydroxyl groups or copolymers, containing hydroxyl groups, of olefinically unsaturated compounds, can of course also be employed.

Compounds which have groups which are reactive towards isocyanate groups, in particular hydroxyl, and are suitable for the preparation of the NCO prepolymers are, for example, the compounds disclosed in U.S. Pat. No. 4,218,543. In the preparation of the NCO prepolymers, these compounds having groups which are reactive towards isocyanate groups are reacted with simple polyisocyanates of the type mentioned above by way of example, while maintaining an NCO excess. The NCO prepolymers in general have an NCO content of from 10 to 26, preferably 15 to 26 wt. %. It already emerges from this that in the context of the present invention, "NCO prepolymers" or "prepolymers having terminal isocyanate groups" are to be understood as meaning both the reaction products as such and the mixtures with excess amounts of unreacted starting polyisocyanates, which are often also called "semi-prepolymers".

Possible aliphatic diols having an OH number of >500 mg of KOH/g are the chain lengtheners conventionally used in polyurethane chemistry, such as ethylene glycol, diethylene glycol, propylene glycol, dipropylene glycol, butane-1,4-diol, propane-1,3-diol. Diols, such as 2-butane-1,4-diol, butene-1,3-diol, butane-2,3-diol and/or 2-methylpropane-1,3-diol, are preferred. It is of course also possible to employ the aliphatic diols in a mixture with one another.

Suitable H-active components are polyols having an average OH number of from 5 to 600 mg of KOH/g and an average functionality of from 2 to 6. Polyols having an average OH number of from 10 to 50 mg of KOH/g are preferred. Polyols which are suitable according to the invention are, for example, polyhydroxy-polyethers, which are accessible by alkoxylation of suitable starter molecules, such as ethylene glycol, diethylene glycol, 1,4-dihydroxybutane, 1,6-dihydroxyhexane, dimethylolpropane, glycerol, pentaerythritol, sorbitol or sucrose Ammonia or amines, such as ethylenediamine, hexamethylenediamine, 2,4-diaminotoluene, aniline or amino alcohols, or phenols, such as bisphenol A, can likewise function as starters. The alkoxylation is carried out using propylene oxide and/or ethylene oxide in any desired sequence or as a mixture.

In addition to polyols, at least one further crosslinking agent and/or chain lengthener chosen from the group which contains amines and amino alcohols, for example ethanolamine, diethanolamine, diisopropanolamine, ethylenediamine, triethanolamine, isophoronediamine, N,N'-dimethyl (diethyl)-ethylenediamine, 2-amino-2-methyl (or ethyl)-1-propanol, 2-amino-1-butanol, 3-amino-1,2-propanediol, 2-amino-2-methyl(ethyl)-1,3-propanediol, and alcohols, for example ethylene glycol, diethylene glycol, 1,4-dihydroxybutane, 1,6-dihydroxyhexane, dimethylolpropane, glycerol and pentaerythritol, and sorbitol and sucrose, or mixtures of these compounds, can additionally be present.

Polyester polyols such as are accessible in a manner known per se by reaction of low molecular weight alcohols with polyfunctional carboxylic acids, such as adipic acid, phthalic acid, hexahydrophthalic acid, tetrahydrophthalic acid or the anhydrides of these acids are furthermore suitable as long as the viscosity of the H-active component does not become too high. A preferred polyol which contains ester groups is castor oil. In addition, formulations with castor oil such as can be obtained by dissolving resins, e.g. aldehyde-ketone resins, and modifications of castor oil and polyols based on other natural oils are also suitable.

Those higher molecular weight polyhydroxy-polyethers in which high molecular weight polyadducts or polycondensates or polymers are present in finely disperse, dissolved or grafted-on form are likewise suitable. Such modified polyhydroxy compounds are obtained in a manner known per se, e.g. when polyaddition reactions (e.g. reactions between polyisocyanates and amino-functional compounds) or polycondensation reactions (e.g. between formaldehyde and phenols and/or amines) are allowed to proceed in situ in the compounds containing hydroxyl groups. However, it is also possible to mix a ready-made aqueous polymer dispersion with a polyhydroxy compound and then to remove the water from the mixture.

Polyhydroxy compounds modified by vinyl polymers, such as are obtained e.g. by polymerization of styrene and acrylonitrile in the presence of polyethers or polycarbonate polyols, are also suitable for the preparation of polyurethanes. If polyether polyols which have been modified in accordance with DE-A 2 442 101, DE-A 2 844 922 and DE-A 2 646 141 by grafting polymerization with vinylphosphonic acid esters and optionally (meth)acrylonitrile, (meth)acrylamide or OH-functional (meth)acrylic acid esters are used, plastics of particular flame resistance are obtained.

Representatives of the compounds mentioned which are to be used as H-active compounds are described e.g. in High Polymers, vol. XVI, "Polyurethanes Chemistry and Technology", Saunders-Frisch (ed.) Interscience Publishers, New York, London, vol. 1, p. 32-42, 44, 54 and vol. II, 1984, p. 5-6 and p. 198-199.

Mixtures of the compounds listed can also be employed.

The limit to the average OH number and average functionality of the H-active component results in particular from the increasing embrittlement of the resulting polyurethane. However, the possibilities of influencing the physical polymer properties of the polyurethane are known in principle to the person skilled in the art, so that the NCO component, aliphatic diol and polyol can be coordinated to one another in a favourable manner.

The polyurethane layer (b) can be foamed or solid, such as e.g. as a lacquer or coating.

All auxiliary substances and additives known per se, such as e.g. release agents, blowing agents, fillers, catalysts and flameproofing agents, can be employed for the production thereof.

In this context, auxiliary substances and additives which are optionally to be used are:
  a) Water and/or Readily Volatile Inorganic or Organic Substances as Blowing Agents
  b) Catalysts
  c) Surface Active Additives, Such as Emulsifiers and Foam Stabilizers.
  d) Reaction Retardants
  e) Additives Lacquers to be used according to the invention include 1-C and 2-C lacquer systems, preferably water-based lacquers. A two-component lacquer (2-C) in the context of the invention also contains a hardener in addition to the water-based lacquer according to the invention.

According to one embodiment, the water-based lacquer according to the invention is a one-component lacquer.

In an alternative embodiment, the coating on at least one side is a water-based 2-component polyurethane lacquer.

2-Component polyurethane lacquers to be used according to the invention are characterized in that they preferably essentially contain in one embodiment:
- (a) polyisocyanates, which are optionally hydrophilized, optionally in the presence of organic solvents or solvent mixtures,
- (b) compounds which have groups which are reactive towards isocyanates and are optionally hydrophilized, in water and optionally in the presence of organic solvents or solvent mixtures,
- (c) optionally further additives and auxiliary substances, wherein the amounts of (a)+(b) are from 20 to 100 parts by wt., the amount of (c) is from 0 to 80 parts by wt., with the proviso that the sum of the parts by weight of the individual components (a) to (c) is 100.

Two-component systems in the context of the present invention are understood as meaning lacquers in which components (a) and (b) must or should be stored in separate vessels because of their reactivity. The two components are mixed only shortly before application and then in general react without additional activation.

The (poly)isocyanate component (a) preferably is any desired organic polyisocyanates which have aliphatically, cycloaliphatically, araliphatically and/or aromatically bonded, free isocyanate groups and are liquid at room temperature or are diluted with solvents for this purpose. The polyisocyanate component (a) advantageously has a viscosity at 23° C. of from 10 to 15,000, preferably 10 to 5,000 mPas. The polyisocyanate component (a) is particularly preferably polyisocyanates or polyisocyanate mixtures with exclusively aliphatically and/or cycloaliphatically bonded isocyanate groups having an (average) NCO functionality of between 2.0 and 5.0 and a viscosity at 23° C. of from 10 to 2,000 mPas.

Preferably, polyisocyanates having free NCO groups are employed as crosslinking agents, in order to obtain a particularly high level of lacquer technology from the water-based two-component polyurethane lacquers. Suitable such crosslinker resins are, for example, polyisocyanates based on isophorone-diisocyanate (IPDI), hexamethylene-diisocyanate (HDI), 1,4-diisocyanatocyclohexane, bis-(4-isocyanatocyclohexyl)-methane, 1,3-diisocyanatobenzene, 2,4- and/or 2,6-diisocyanatotoluene (TDI), diisocyanatodiphenylmethane (MDI) and ω,ω'-diisocyanato-1,3-dimethylcyclohexane (H6XDI). Polyisocyanates based on isophorone-diisocyanate, hexamethylene-diisocyanate, bis-(4-isocyanatocyclohexyl)-methane and ω,ω'-diisocyanato-1,3-dimethylcyclohexane (H6XDI) are preferred.

The diisocyanates mentioned may optionally be used as such, but as a rule derivatives of the diisocyanates are used. Suitable derivatives are polyisocyanates containing biuret, isocyanurate, uretdione, urethane, iminooxadiazinedione, oxadiazinetrione, carbodiimide, acylurea and allophanate groups.

Preferred derivatives are those with isocyanurate, iminooxadiazinedione and uretdione structures. Low-monomer lacquer polyisocyanates with these structural elements from isophorone-diisocyanate (IPDI), hexamethylene-diisocyanate (HDI), 1.4-diisocyanatocyclohexane, bis-(4-isocyanatocyclohexyl)-methane are particularly preferred.

Triisocyanates, such as e.g. TIN (triisocyanatononane) are also suitable.

The (poly)isocyanate component (a) can optionally be hydrophilically modified. Water-soluble or -dispersible polyisocyanates are obtainable e.g. by modification with carboxylate, sulfonate and/or polyethylene oxide groups and/or polyethylene oxide/polypropylene oxide groups.

Hydrophilization of the polyisocyanates is possible e.g. by reaction with deficient amounts of monofunctional, hydrophilic polyether alcohols. The preparation of such hydrophilized polyisocyanates is described, for example, in EP-A 0 540 985, p. 3, I. 55-p. 4, I. 5. The polyisocyanates described in EP-A-0 959 087, p. 3, I. 39-51 which contain allophanate groups and are prepared by reaction of low-monomer polyisocyanates with polyethylene oxide polyether alcohols under allophanation conditions are also particularly suitable. The water-dispersible polyisocyanate mixtures based on triisocyanatononane which are described in DE-A 10 007 821, p. 2, I. 66-p. 3, I. 5, are also suitable, as well as polyisocyanates hydrophilized with ionic groups (sulfonate, phosphonate groups), such as are described e.g. in DE-A 10 024 624, p. 3, I. 13-33 or also in WO 01/88006. External hydrophilization by addition of emulsifiers is likewise possible.

The NCO content of the polyisocyanate component (a) used, e.g. in the case of so-called polyether allophanates (hydrophilization by means of a polyether), can range from 5-25 wt. %. In the case of a hydrophilization with sulfonic acid groups, NCO contents of 4-26 wt. % can be achieved, where these figures are to be understood as being only by way of example.

The isocyanate components employed can also be partially blocked, e.g. by up to one third of the isocyanate groups present, by components which are reactive towards isocyanates. In this case, reaction of the blocked isocyanate component with further polyol can occur in a later step, in order to bring about a further crosslinking.

Suitable blocking agents for these polyisocyanates are, for example, monofunctional alcohols, such as oximes, such as acetoxime, methyl ethyl ketoxime, cyclohexanone oxime, lactams, such as ε-caprolactam, phenols, amines, such as diisopropylamine or dibutylamine, dimethylpyrazole or triazole, and malonic acid dimethyl ester, malonic acid diethyl ester or malonic acid dibutyl ester.

The use of low-viscosity, hydrophobic or hydrophilized polyisocyanates having free isocyanate groups based on aliphatic, cycloaliphatic, araliphatic and/or aromatic isocyanates, particularly preferably aliphatic or cycloaliphatic isocyanates, is preferred, since a particularly high level of properties of the lacquer film can be achieved in this way. The advantages of the binder dispersions according to the invention emerge most clearly in combination with these crosslinking agents. These polyisocyanates in general have a viscosity of from 10 to 3,500 mPas at 23° C. If necessary, the polyisocyanates can be employed in a mixture with small amounts of inert solvents in order to lower the viscosity to a value within the range stated. Triisocyanatononane can also be employed as the crosslinker component alone or in mixtures.

The use of mixture of various polyisocyanates is of course also possible in principle.

Suitable compounds (b) having groups which are reactive towards isocyanates are, for example, polymers, containing hydroxyl groups, sulfonate and/or carboxylate groups, preferably carboxylate groups and optionally sulfonic acid and/or carboxyl groups, preferably carboxyl groups, of olefinically unsaturated monomers (so-called polyacrylate polyols), of combinations of diols and dicarboxylic acids (so-called polyester polyols), of combinations of diols, dicarboxylic acids and diisocyanates (so-called polyurethane polyols) and/or of hybrid systems of the polyol classes mentioned, for example polyacrylate-polyester polyols, polyacrylate-polyurethane polyols, polyester-polyurethane polyols or polyester-polyurethane polyols, which preferably have a molecular weight Mn (number-average), which can be determined by gel permeation chromatography, of from 500 to 50,000, in particular 1,000 to 10,000, a hydroxyl number of from 16.5 to 264, preferably 33 to 165 mg of KOH/g of solid resin, an acid number (based on the non-neutralized sulfonic acid and/or carboxyl groups) of from 0 to 150, preferably 0 to 100 mg of KOH/g of solid resin, and a content of sulfonate and/or carboxyl groups of from 5 to 417, preferably 24 to 278 milliequivalents per 100 g of solid.

These anionic groups are particularly preferably carboxylate groups. An overview of various binders is given e.g. in EP-A 0 959 115, p. 3, I. 26-54. However, simple diol components can also be used. All binders which are dissolved or dispersed in water and have groups which are reactive towards isocyanates are suitable in principle as the binder component (b). These also include, for example, polyurethanes or polyureas which are dispersed in water and can be crosslinked with polyisocyanates due to the active hydrogen atoms present in the urethane or urea groups. However, polyols, that is to say compounds with free OH groups, are preferred. The binder components (b) are in general employed in the preparation of the coating compositions in the form of 10 to 60, preferably 20 to 50 wt. % strength aqueous solutions and/or dispersions, which in general have a viscosity of from 10 to 105, preferably 100 to 10,000 mPa·s/23° C. and pH values of from 5 to 10, preferably 6 to 9. Auxiliary solvents can optionally be used. Depending on the molecular weight of the binder component (b) and its content of anionic groups or of free acid groups, in particular carboxyl groups, the aqueous systems containing the polymers are true dispersions, colloidally disperse or molecularly disperse dispersions, but in general so-called "partial dispersions", i.e. aqueous systems which are partly molecularly disperse and partly colloidally disperse.

The ratio of isocyanate groups from component (a) to isocyanate-reactive groups, such as hydroxyl groups (NCO—OH ratio) from component (b) can span a wide range. A ratio of from 0.2:1.0 to 4.0:1.0 can thus be used for lacquer technology uses. A range of from 0.35:1 to 2.0:1.0 is preferred, particularly preferably 1.0:1.0 to 1.5:1.0.

1 to 10,000 ppm of commercially available catalysts can optionally be added to the composition.

The conventional auxiliary substances and additives (d) of lacquer technology, such as e.g. defoaming agents, thickening agents, pigments, dispersing auxiliaries, further catalysts which differ from (c), skin prevention agents, antisettling agents or emulsifiers, can be added before, during or after the preparation of the aqueous binder dispersion according to the invention and also in the case of preparation of the coating compositions by addition of at least one crosslinking agent.

The composite article may be prepared in a single injection molding machine or two or more injection molding machines (e.g., a first molding machine for molding a substrate layer and a second molding machine for molding the cover layer. Preferably the composite article is prepared in a single molding machine so that substrate layer can be molded in a mold and the cover layer can be molded over the substrate layer without removing the substrate layer from the mold. For example, a cavity of the mold may change in volume after molding the substrate layer so that a gap exists over a surface of the substrate layer for the introduction of a polymerizable composition for forming the cover layer.

The process may include a step of injection molding the polymeric composition into the mold at a temperature above a softening temperature of the polymeric composition (e.g., at a temperature above the glass transition temperature of the polycarbonate). The mold temperature preferably is at a temperature sufficiently low so that the polycarbonate solidifies in the mold (e.g., by cooling below its glass transition temperature).

The two-component polyurethane systems may contain water and/or organic solvents or mixtures thereof as solvents.

The composite articles according to the teachings herein may be used in automotive and non-automotive applications. Preferred automotive applications include automotive interior parts and automotive exterior parts. The composite articles are particularly useful in applications that are visible. Preferred parts include interior automotive trim decoration parts (e.g., dashboard and door panels) and automotive exterior trim parts (e.g., for A-pillars and B-pillars.

The composite articles according to the teachings herein may be used in automotive and non-automotive applications. Preferred automotive applications include automotive interior parts and automotive exterior parts. The composite articles are particularly useful in applications that are visible. Preferred parts include interior automotive trim decoration parts (e.g., dashboard and door panels) and automotive exterior trim parts (e.g., for A-pillars and B-pillars.

Test Methods

Coefficient of Linear Thermal Expansion

The coefficient of linear thermal expansion (CLTE) is measured according to ISO 1359-2 in the temperature interval from −30° C. to 30° C. on an ISO tensile bar (as used for ISO 527-1).

Stiffness/Modulus

The tensile modulus is measured according to ISO 527-1, -2, at about 23° C.

Flexural Modulus

The flexural modulus is measured according to ISO 178.

Molecular Weight

The weight average molecular weight, number average molecular weight, and polydispersity index are measured by gel permeation chromatography (GPC).

Adhesion

Adhesion is measured using PosiTest® AT-A Automatic Adhesion Tester, commercially available from DeFelsko. The dolly is glued onto the cover layer and the cover layer is cut around a perimeter of the dolly. The force to remove the cover layer is measured. Unless otherwise specified, the diameter of the dolly is about 20 mm.

Aging Durability

Aging durability is measured using the PosiTest® AT-A Automatic Adhesion Tester as described herein, on samples that have been aged. Examples of key aging tests are described below:

Short Thermal Cycling Test: Volkswagen PV1200 Aging Test

Each cycle lasts for 720 minutes (12 hours) and includes: (1) heating the part from 23° C. to 80° C. at 80% relative humidity over a time of 60 minutes; (2) holding for 240 minutes at 80° C. and 80% relative humidity; (3) cooling to −40° C. over a period of 120 hours with the humidity dropping to about 30% relative humidity near the freezing point, and the humidity not regulated below the freezing point; (4) holding at −40° C. for 240 minutes; (5) heating for 60 minutes from −40° C. to 23° C. with humidity regulation (of about 30% relative humidity when the temperature passes 0° C. Unless otherwise stated, the samples are cycled for 8 cycles (i.e., about 96 hours).

Hot Photo-Aging Test: VDA 75202

VDA 75202 is performed using a XENOTEST ALPHA test device. Test condition is type 3. The number of periods of exposure is 4. The black standard temperature is about 90° C. The temperature is about 65° C. and the relative humidity is 10-30 percent. The radiation intensity 60 W/m$^2$ (measured over a wavelength range of 300 to 400 nm).
Thermo-Oxidative Aging Thermo-oxidative aging is performed in an oven at a constant temperature of about 120° C. for about 240 hours.

Solar Simulation Test—DIN 75220 Indoor 1T

The test is performed for 240 hours at about 80° C. and less than 30% relative humidity. The radiation intensity is about 830 W/m$^2$. The spectral energy is about 6.9% UV light (295-400 nm), about 59.7% visible light (400-800 nm), and about 48.6% infrared light (800-2450 nm).
Hydrolytic Testing (Based on DBL 7384-8.1.18)

Testing is performed for 72 hours at 90° C. with a relative humidity of about 98 to 100 percent.
Melt Flow Rate Unless otherwise stated, the melt flow rate is measured according to ISO 1133, and is expressed in units of g/10 min. For polycarbonate polymers, the melt flow rate is measured at a temperature of about 300° C. and a load of about 1.2 kg. For acrylonitrile-butadiene-styrene thermoplastics (e.g., ABS thermoplastics), the melt flow rate is measured at a temperature of about 220° C. and a load of about 10.0 kg. For styrene-acrylonitrile copolymers, the melt flow rate is measured at a temperature of about 230° C. and a load of about 3.8 kg. For PCABS resins the melt flow rate is measured at a temperature of about 260° C. and a load of about 5.0 kg.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.
Materials ABS-A is MAGNUM® 8434 acrylonitrile-butadiene-styrene thermoplastic (commercially available from TRINSEO) having a density of about 1.05 g/cm3 (as measured according to ISO 1183) and a melt flow rate of about 13 g/10 min (as measured according to ISO 1133 at 220° C./10 kg). Magnum® 8434 is a mass ABS and includes about 10-12 weight percent butadiene, about 65-70 weight percent styrene and about 20-24 weight percent acrylonitrile.

ABS-B is MAGNUM® 3904 acrylonitrile-butadiene-styrene thermoplastic (commercially available from TRINSEO) having a density of about 1.05 g/cm3 (as measured according to ISO 1183) and a melt flow rate of about 4.5 g/10 min (as measured according to ISO 1133 at 220° C./10 kg). Magnum® 3904 is a mass ABS. The flexural modulus is about 276 kpsi (as measured according to ISO 178 on a 3.2 mm thick injection molded test sample). The tensile strain (yield) at break is about 2.6% (as measured according to ISO 527-2/50 on a 3.2 mm thick injection molded test sample).

Graft ABS—A is Kumho® HR 181 is commercially available from KUMHO PETROCHEMICAL. The rubber content is 57-60 weight percent. The rubber particle size is 0.35-0.40 µm.

Figure 2:
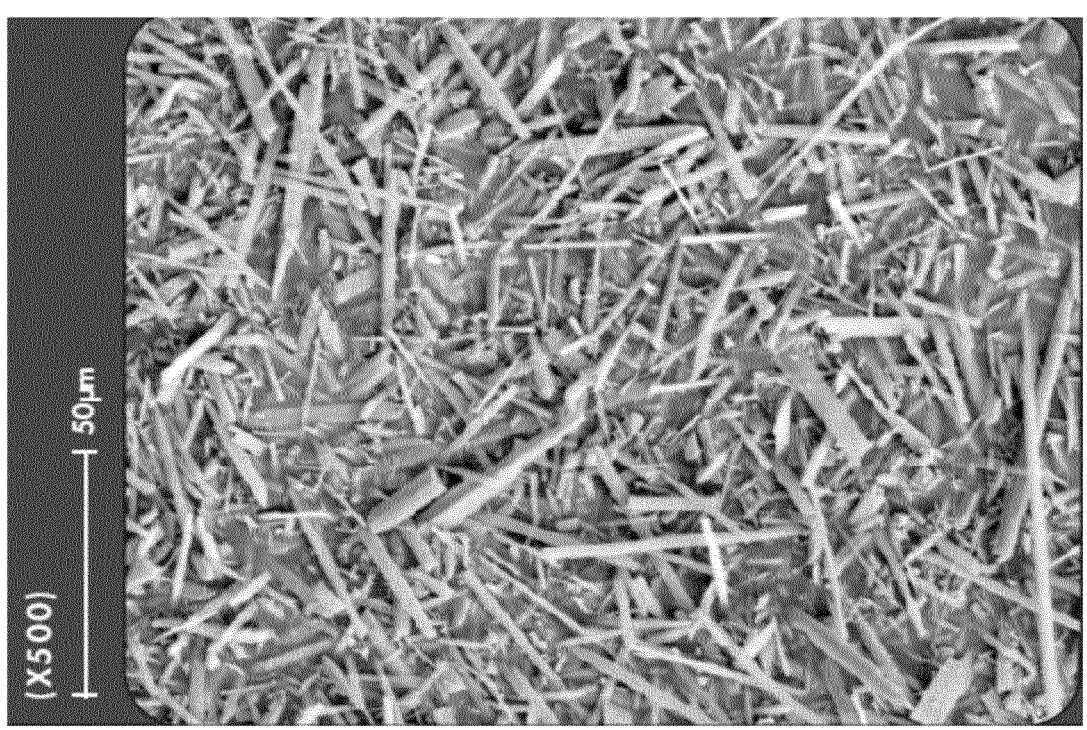
FIG. 2 is an illustrative optical micrograph of an acicular filler according to the teachings herein.

Filler A is NYGLOS® 4W 10992 wollastonite commercially available from NYCO MINERALS. Filler A has a chemical composition of $CaSiO_3$, including about 46.15 weight percent CaO, about 51.60 weight percent $SiO_2$, about 0.77 weight percent $Fe_2O_3$, about 0.34 weight percent $Al_2O_3$, about 0.16 weight percent MnO, about 0.38 weight percent MgO, about 0.05 weight percent $TiO_2$, and about 0.05 weight percent $K_2O$. Filler A has an acicular structure with an aspect ratio of about 11:1, such as illustrated in FIG. 2. Filler A has a Mohs hardness of about 4.5, a median particle size of about 4.5 µm (Cilas Granulometer), a minus 325 U.S. mesh screen of about 99.9 percent (Apline Jet Sieve), a G.E. Brightness of about 92 as measured according to ASTM E07, a bulk density (loose) of about 0.2 g/cm3 as measured according to ASTM C87, a bulk density (tapped) of about 0.35 as measured according to ASTM C87, an oil absorption of about 75 lbs./100 lbs. as measured according to ASTM D281, and a specific gravity of about 2.9. The wollastonite is coated with an organic sizing.

Filler B is glass fibers. ThermoFlow® 720 chopped class fibers coated with sizing. Commercially available from JOHNSMANVILLE. The fibers are E-glass fibers (aluminoborosilicate glass) have a nominal filament diameter of about 13 μm and a length of about 4.7 mm.

Filler C is a talc filler.

PC—A is a linear polycarbonate of bisphenol A having a melt flow rate (i.e., a melt mass-flow rate) of about 10 g/10 min, measured according to ISO 1133 at 300° C./1.2 kg. PC-A has a tensile modulus of about 2300 MPa, a tensile strength of about 60.0 MPa at yield, a tensile strength of about 71.0 MPa at break, a tensile elongation at yield of about 6%, and a tensile elongation at break of about 150%, all measured according to ISO 527-2/50. PC-A has a refractive index of about 1.586 as measured according to ISO 489, optical transmittance of about 89.0% and haze of about 1.0% both measured according to ASTM D1003. PC-A has a flexural modulus of about 2400 MPa as measured according to ISO 178, Charpy Notched Impact Strength of 35 kJ/m$^2$ as measured according to ISO 179/e1A at 23° C., a Notched Izod Impact of 90 kJ/m$^2$ as measured according to ISO 180/A at 23° C., and an unnotched Izod Impact of "No Break" as measured according to ISO 180 at 23° C. PC-A has a coefficient of linear thermal expansion of about 6.8× 10$^{-5}$ cm/cm/° C. from −40° C. to 82° C. as measured according to ASTM D696. PC-A is commercially available from TRINSEO as CALIBRE™ 300-10 polycarbonate resin.

Ethylene Copolymer a—Amplify EA 101.

Additives package A—is an additive package including a heat stabilizer and a process aid. The additives package includes CCSAN BLACK color concentrate, Irganox 1076, and LOXIOL EP 861 at a weight ratio of about 10:1:2.

Polyurea system A is a highly transparent polyurea coating system.

Polyurea system B is a black polyurea system. This system includes a 2K hardener including an isocyanate and an acetate.

Polyurethane system A is a polyurethane system including a colour paste for coloring the cover layer.

TABLE 1

|  | Example 1 | Example 2 | Example 3 | Example 4 |
|---|---|---|---|---|
| PC-A | 39.6 | 36.6 | 36.6 | 36.1 |
| Mass ABS-A | 50.1 | 45.1 | 45.1 | 43.6 |
| Mass ABS-B |  |  |  |  |
| Grafted ABS - A | 9.0 | 9.0 | 9.0 | 9.0 |
| Filler A |  | 8.0 |  |  |
| Filler B |  |  | 8.0 |  |
| Filler C |  |  |  | 10.0 |
| Additives-A | 1.3 | 1.3 | 1.3 | 1.3 |
| Functionalized Copolymer A |  |  |  |  |
| Total | 100.0 | 100.0 | 100.0 | 100.0 |
| Initial Adhesion, MPa | 6.1 | 4.7 | 6.0 | 4.8 |
| Adhesion after PV1200 | 8.0 | 5.1 | 5.4 | 4.9 |
| Adhesion after 72 hours 90° C. | 7.8 |  | 5.0 |  |

TABLE 2

|  | Example 5 | Example 6 | Example 7 |
|---|---|---|---|
| PC-A | 36.6 | 36.6 | 36.6 |
| Mass ABS-A | 42.1 |  | 54.1 |
| Mass ABS-B |  | 54.1 |  |
| Grafted ABS - A | 9.0 |  |  |
| Filler A | 8.0 | 8.0 |  |
| Filler B |  |  |  |
| Filler C |  |  | 8.0 |
| Additives-A | 1.3 | 1.3 | 1.3 |
| Functionalized Copolymer A | 3.0 |  |  |
| Total | 100.0 | 100.0 | 100.0 |
| Initial Adhesion, MPa | 4.7 | 5 | 3.7 |
| Adhesion after PV1200 | 4.4 | 4.6 | 3.8 |
| Adhesion after 72 hours 90° C. |  |  | 4.5 |

TABLE 3

|  | Example 8 | Example 9 | Example 10 |
|---|---|---|---|
| Substrate Layer | Example 1 | Example 1 | Example 1 |
| Cover Layer |  |  |  |
| Polyurea System B | X |  |  |
| Polyurethane System A |  | X |  |
| Polyurea System A |  |  | X |
| Initial Adhesion (as molded) | 4.7 | 4.5 | 4.8 |
| Adhesion after aging |  |  |  |
| Hydrolysis 72 hours at 90° C., 98-100% relative humidity | 4.1 | 4.8 | 3.3 |
| Hot light aging (VDA 75202), 4 days | 5.1 | 4.6 | 4.4 |
| PV1200, 8 cycles/96 hours | 9.6 | 8.0 | 8.9 |
| Thermo-oxidative aging, 240 hours, 120° C. | 5.6 | 7.0 | 7.1 |
| Solar Simulation (DIN 75220), 10 days, 80° C., 830 W/m$^2$ | 7.8 | 6.8 | 8.9 |

Example 1 is prepared by injection molding the polymeric composition as shown in Table 1. The temperature profile from the hopper to the nozzle is 240/250/255/260° C., and the hot runner has a temperature of about 275° C. The screw diameter is about 55 mm. The cushion is about 3.8 cm$^3$. The plasticizing time is about 11 seconds. The dosing is about 247.1 cm$^3$, the injection time is about 1.45 seconds. The injection pressure is about 1500 bar and the back pressure is about 100 bar. The injection speed is about 125 cm$^3$/sec. The hold pressure is 450/400/350 bar, for 0.5 seconds each. The temperature of the mold is about 80° C. and the cooling time is about 70 seconds. The thickness of the substrate layer is about 3.4 mm. The part weight is about 222.5 g. After the substrate layer has cooled, the cavity is enlarged for creating a gap for injecting the polymerizable composition. A gap is formed over a surface of the substrate layer. The polymerizable composition is injected into the cavity to fill the gap and contact the surface of the substrate layer. The mold temperature during this step is about 80° C. After the cover layer has partially polymerized, the composite part is removed from the cavity. The total cycle time is about 105 seconds. The total thickness of the composite material is about 4.76 mm.

The polymerizable composition is a 2K polyurethane RIM system.

Adhesion between the cover layer and the substrate layer is measured using the PosiiTest AT-A. The dolly size is about 20 mm.

Adhesion is measured on samples as prepared. Adhesion is also measured after climatic aging according to Volkswagen PV1200. Adhesion is also measured after heat aging for 72 hours at 90° C. The results are shown in Table 1.

Example 2-4 are prepared using the same method as Example 1, except the polymeric composition includes a filler as shown in Table 1. Example 2 includes a wollastonite. Example 3 includes glass fibers. Example 4 includes a talc.

Examples 5 is prepared using the same method as Example 1, except the polymeric composition includes wollastonite and an ethylene copolymer as listed in Table 2.

Example 6 is prepared using the same method as Example 1, except a different mass ABS is used, the composition includes a wollastonite, and the grafted ABS is not used. The composition is listed in Table 2.

Example 7 is prepared using the same method as Example 1, except using the polymeric composition shown in Table 2. This composition includes talc.

Examples 8 is prepared using the same method as Example 1, except the cover layer is Polyurea System B.

Example 9 is prepared using the same method as Example 1, except the cover layer is Polyurethane System A.

Example 10 is prepared using the same method as Example 1, except the cover layer is Polyurea System A.

Examples 8, 9, and 10 are tested for adhesion as molded and after the following aging conditions.

Hydrolysis aging: 72 hours @ 90° C. and 98-100% relative humidity.
Hot Light Aging—4 days according to VDA 75202.
Weathering—8 cycles/96 hours, according to Volkswagen PV1200.
Thermo-oxidative aging—240 hours at 120° C.
Solar Simulation—DIN 75220-10 days; 80° C.; 830 W/m$^2$.

What is claimed is:

1. A multi-layer article comprising:
i) a substrate layer including a polymeric composition, wherein the polymeric composition is a blend comprising: two or more polymers including a polycarbonate component and a toughening component, wherein the toughening component includes a styrene-acrylonitrile copolymer and an impact modifier; wherein the impact modifier is a polybutadiene rubber, and
ii) a cover layer having a thickness of 3 mm or less and including a polyurethane and/or a polyurea bonded directly to the polymeric composition of the substrate layer;
wherein the concentration of the two or more polymers is about 70 weight percent to 99 weight percent, based on the total weight of the polymeric composition, the total weight of the polycarbonate component and the toughening component is about 75 weight percent to about 100 weight percent, based on the total weight of the two or more polymers of the polymeric composition, and a weight ratio of the polycarbonate component to the toughening component is about 10:90 to 45:55 and a concentration of the polybutadiene rubber is 3 weight percent to 11 weight percent, based on the total weight of the polymeric composition;
wherein the amount of polyester in the polymeric composition is 0 to 1.9 weight percent, based on the total weight of the polymeric composition;
wherein the amount of any polyamide in the polymeric composition is 0.4 weight percent or less.

2. The multi-layer article of claim 1, wherein the polymeric composition includes a reinforcing filler in an amount from about 3 weight percent to about 30 weight percent based on the total weight of the polymeric composition.

3. The multi-layer article of claim 2, wherein the toughening component includes a mass ABS and a grafted ABS impact modifier having a polybutadiene concentration of about 45 weight percent or more and about 85 weight percent or less, based on the total weight of the grafted ABS impact modifier, wherein the grafted ABS impact modifier includes at least a portion of the styrene-acrylonitrile copolymer and at least a portion of the polybutadiene rubber.

4. The multi-layer article of claim 2, wherein the styrene acrylonitrile copolymer is a random copolymer including about 97 wt. % or more of acrylonitrile and styrene.

5. The multi-layer article of claim 2, wherein the reinforcing filler includes glass fibers, wollastonite, or both.

6. The multi-layer article of claim 2, wherein the substrate layer has a thickness from about 0.3 mm to about 10 mm and the cover layer has a thickness from about 0.2 mm to about 1.5 mm.

7. The multi-layer article of claim 2, wherein the cover layer is a compact layer having a porosity of about 10 volume percent or less; and
the substrate layer is a dense substrate layer having a porosity of about 10 volume percent or less.

8. The multi-layer article of claim 2, wherein the polymeric composition includes from about 0.2 to about 9 weight percent of one or more ethylene copolymers, wherein the ethylene copolymer includes a functionalized monomer.

9. The multi-layer article of claim 1, wherein
the substrate layer is colored by a pigment or other colorant, and the cover layer is substantially clear and/or substantially transparent; and the substrate layer includes one or more additives selected from the group consisting of an antioxidant, a process aid, a light stabilizer, a heat stabilizer, a mold release agent and a flow modifier.

10. The multi-layer article of claim 2, wherein
the amount of any styrene copolymer including maleic anhydride, maleic acid, or other monomer that provides a carboxyl group to the styrene copolymer in the substrate layer is about 0.9 weight percent or less, based on the total weight of the polymeric composition.

11. The multi-layer article of claim 2, wherein the filler includes a wollastonite having a sizing; and a total amount of the filler, the toughening component, and the polycarbonate in the substrate layer is about 95 weight percent or more, based on the total weight of the substrate layer; wherein the toughening component includes a mass ABS and any additional styrene-acrylonitrile copolymer.

12. The multi-layer article of claim 7, wherein
the amount of polyester in the polymeric composition is about zero weight percent;
the toughening component includes a mass ABS;
the filler includes a wollastonite having an organic sizing;
the total amount of the filler; the toughening component, and the polycarbonate in the substrate layer is about 95 weight percent or more, based on the total weight of the substrate layer;
the substrate layer has a thickness from about 0.3 mm to about 10 mm;
the cover layer is an overmolded layer having a thickness from about 0.2 mm to about 1.5 mm;
the polymeric composition includes an ABS thermoplastic (i.e., an acrylonitrile-butadiene-styrene thermoplastic) including a polybutadiene containing phase dispersed in a styrene-containing phase including the styrene acrylonitrile copolymer, wherein the styrene acrylonitrile copolymer includes about 60 weight percent or more styrene and about 15 weight percent or more acrylonitrile, based on the total weight of the acrylonitrile styrene copolymer; and the styrene acrylonitrile copolymer is a random copolymer including about 97 wt. % or more acrylonitrile and styrene.

13. The multi-layer article of claim 1, wherein
the polybutadiene rubber is present in an amount from 5 to 11 weight percent, based on the total weight of the polymeric composition;
the cover layer is a compact cover layer having a porosity of 20 volume percent or less; and
the substrate layer is a dense substrate layer having a porosity of 10 volume percent or less.

14. The multi-layer article of claim 1, wherein
the cover layer is an overmolded layer having a thickness of 0.15 mm to 3 mm;
the polybutadiene rubber is present in an amount from 5 to 11 weight percent, based on the total weight of the polymeric composition;
the cover layer is a compact cover layer having a porosity of 20 volume percent or less; and
the substrate layer is a dense substrate layer having a porosity of 10 volume percent or less; and
the polymeric composition is free of filler or includes less than 10 weight percent filler; and
the polymeric composition is free of the polyester.

15. The multi-layer article of claim 1, wherein the toughening component is a mass ABS.

16. The multi-layer article of claim 1, wherein the polymeric composition is free of the polyester, and the concentration of the polybutadiene rubber is 7 to 11 weight percent, based on the total weight of the polymeric composition; and wherein the cover layer is polymerized over the substrate layer in a time of 50 minutes or less.

17. The multi-layer article of claim 16, wherein the reinforcing filler includes glass fibers and wollastonite.

18. A multi-layer article-comprising:
i) a substrate layer including a polymeric composition, wherein the polymeric composition is a blend comprising: two or more polymers including a polycarbonate component and a toughening component, wherein the toughening component includes a styrene-acrylonitrile copolymer and an impact modifier; wherein the impact modifier is a polybutadiene rubber, and
ii) a cover layer including a polyurethane and/or a polyurea bonded directly to the substrate layer;
wherein the concentration of the two or more polymers is about 70 weight percent or more and about 100 weight percent or less based on the total weight of the polymeric composition, the total weight of the polycarbonate component and the toughening component is about 75 weight percent to about 100 weight percent, based on the total weight of the two or more polymers of the polymeric composition, and a weight ratio of the polycarbonate component to the toughening component is about 10:90 or more and less than 55:45, and a concentration of the polybutadiene rubber is 3 weight percent or more and 11 weight percent or less,-based on the total weight of the polymeric composition;
wherein the toughening component includes a mass ABS, wherein the mass ABS includes at least a portion of the styrene-acrylonitrile copolymer and at least a portion of the polybutadiene rubber;
wherein the amount of any polyamide in the polymeric composition is 0.4 weight percent or less.

19. The multi-layer article of claim 18, wherein the amount of polyester in the polymeric composition is 0 to 1.9 weight percent, based on the total weight of the polymeric composition.

20. The multi-layer article of claim 18, wherein the polymeric composition is free of polyester, and the concentration of the polybutadiene rubber is 7 to 11 weight percent, based on the total weight of the polymeric composition; and wherein the cover layer is polymerized over the substrate layer in a time of 50 minutes or less.

* * * * *